United States Patent
Sheng et al.

(10) Patent No.: US 10,750,039 B2
(45) Date of Patent: Aug. 18, 2020

(54) COPYING METHOD AND IMAGE ACQUIRING DEVICE AND COPYING SYSTEM USING THE SAME

(71) Applicant: AVISION INC., Hsinchu (TW)

(72) Inventors: Shao-Lan Sheng, Hsinchu (TW); Chen-Chang Li, Miaoli County (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 15/622,963

(22) Filed: Jun. 14, 2017

(65) Prior Publication Data

US 2017/0374215 A1 Dec. 28, 2017

(30) Foreign Application Priority Data

| Jun. 22, 2016 | (TW) | ............................ 105119504 A |
| Sep. 30, 2016 | (TW) | ............................ 105131688 A |
| Jan. 25, 2017 | (TW) | ............................ 106102813 A |

(51) Int. Cl.
*H04N 1/04* (2006.01)
*H04N 1/00* (2006.01)
*H04N 1/047* (2006.01)

(52) U.S. Cl.
CPC ..... *H04N 1/00604* (2013.01); *H04N 1/00037* (2013.01); *H04N 1/00251* (2013.01); *H04N 1/00411* (2013.01); *H04N 1/047* (2013.01)

(58) Field of Classification Search
CPC .......... H04N 1/00604; H04N 1/00037; H04N 1/00251; H04N 1/00411; H04N 1/047
(Continued)

(56) References Cited

U.S. PATENT DOCUMENTS

| 6,169,873 B1 | 1/2001 | Connolly |
| 9,609,154 B2 * | 3/2017 | Fukumoto .......... G03G 15/5087 |

(Continued)

FOREIGN PATENT DOCUMENTS

| CN | 102014235 A | 4/2011 |
| CN | 102752469 A | 10/2012 |

(Continued)

OTHER PUBLICATIONS

Taiwan Office Action dated Mar. 28, 2018 issued in corresponding application No. 106102813, 23 pages.

*Primary Examiner* — Cheukfan Lee
(74) *Attorney, Agent, or Firm* — Muncy, Geissler, Olds & Lowe, P.C.

(57) ABSTRACT

An image acquiring device comprises: an automatic document feeder comprising: an input tray supporting an information medium; and a control panel comprising an operation button for selecting one image acquiring side of the information medium; an image acquiring assembly acquiring the image of the image acquiring side; a processor electrically connected to the automatic document feeder, the image acquiring assembly and the operation button; a storage, which is electrically connected to the processor and comprises an image module storing program codes for enabling acquiring the image of the image acquiring side; and an output unit receiving and outputting the image of the image acquiring side. The processor controls the image acquiring assembly to acquire the image of the image acquiring side according to the program codes and different signals of the operation button and transmits the image to the output unit. Associated copying method and system are also provided.

21 Claims, 20 Drawing Sheets

(58) Field of Classification Search
USPC .................................................. 358/498, 496
See application file for complete search history.

(56) References Cited

U.S. PATENT DOCUMENTS

| | | | |
|---|---|---|---|
| 2002/0145770 A1* | 10/2002 | Nomura ............. | H04N 1/00278 |
| | | | 358/505 |
| 2003/0170041 A1* | 9/2003 | Katsuyama ............ | G03G 15/23 |
| | | | 399/84 |
| 2005/0094228 A1 | 5/2005 | Sevier | |
| 2009/0252523 A1* | 10/2009 | Mima ....................... | B41J 3/60 |
| | | | 399/82 |
| 2011/0222095 A1 | 9/2011 | Sheng | |
| 2012/0250060 A1* | 10/2012 | Shigenobu ......... | H04N 1/00387 |
| | | | 358/1.13 |
| 2015/0009515 A1* | 1/2015 | Baba ...................... | G06K 15/16 |
| | | | 358/1.12 |
| 2015/0350474 A1 | 12/2015 | Sheng et al. | |
| 2019/0075209 A1* | 3/2019 | Sheng ..................... | H04N 1/04 |

FOREIGN PATENT DOCUMENTS

| | | |
|---|---|---|
| CN | 103029463 A | 4/2013 |
| CN | 105227796 A | 1/2016 |
| TW | 201131366 A | 9/2011 |
| TW | 201545533 A | 12/2015 |
| TW | M521232 U | 5/2016 |

\* cited by examiner

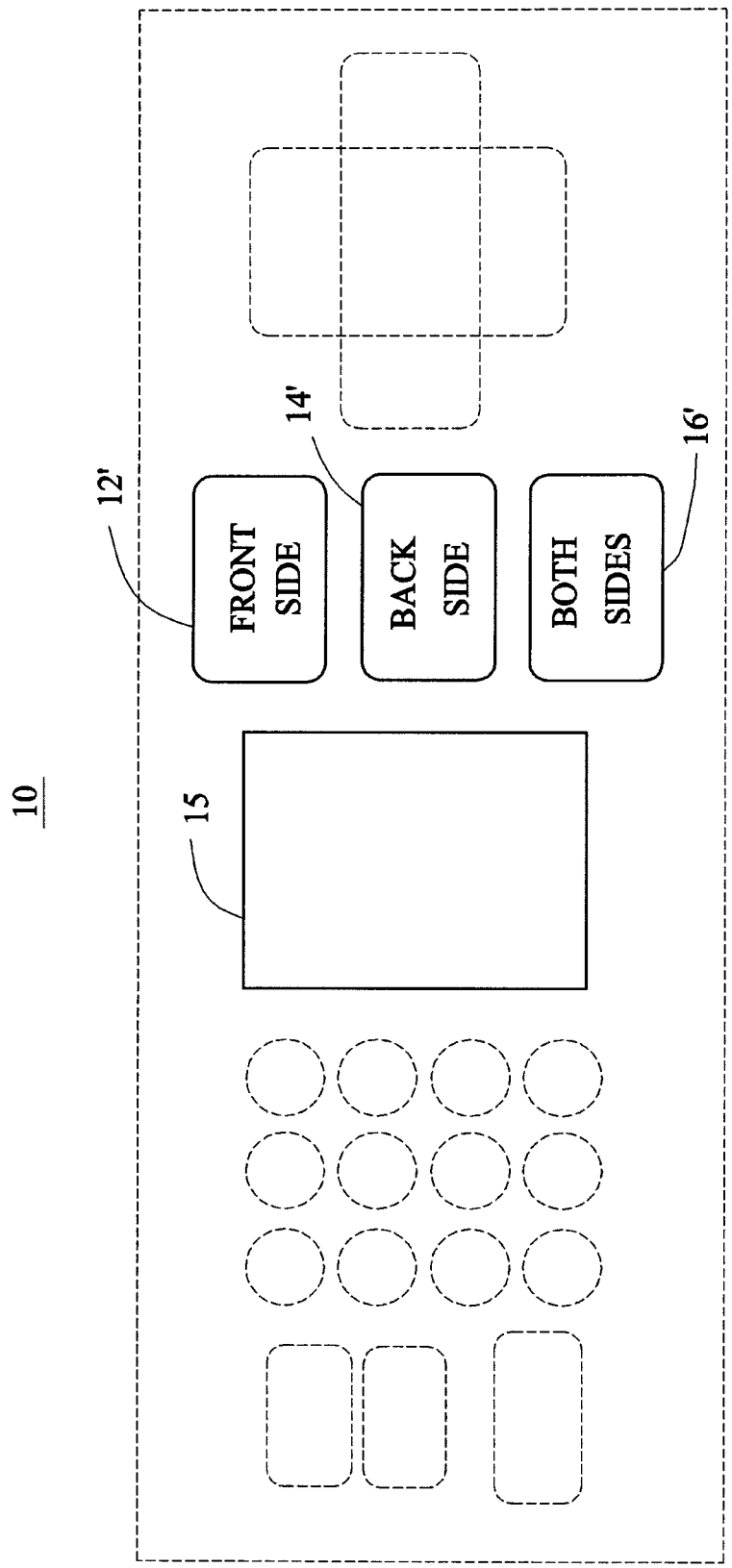

COPYING METHOD AND IMAGE ACQUIRING DEVICE AND COPYING SYSTEM USING THE SAME

This application claims priorities of No. 105119504 filed in Taiwan R.O.C. on Jun. 22, 2016; No. 105131688 filed in Taiwan R.O.C. on Sep. 30, 2016; and No. 106102813 filed in Taiwan R.O.C. on Jan. 25, 2017 under 35 USC 119, the entire contents of which are hereby incorporated by reference.

BACKGROUND OF THE INVENTION

Field of the Invention

This disclosure relates to a copying method, and an image acquiring device and a copying system using the copying method.

Description of the Related Art

When a user is copying an information medium with only one single document, an ordinary flatbed scanner is mostly frequently used at present. However, the flatbed scanner needs to be operated by opening a cover, placing the document in alignment with a predetermined portion, setting the status and starting copying. After the copy is finished, the user tends to forget to take the original information medium due to the too long operation time. If multiple documents need to be copied, using the flatbed scanner is very time-consuming to the user.

In order to save the time, the user may use a scanner in conjunction with an automatic document feeder to perform the scan. However, the automatic document feeders for ordinary peripherals have different internal specifications. In some cases, the document is directly outputted from the front end of the straightforward type document feeder. In other cases, the document is transported through a U-shaped passage and outputted from the rear end of the document feeder. Either the straightforward type or the U-shaped automatic document feeder may be configured to perform the simplex or duplex copying according to the technology of the image acquiring assembly. When the simplex copying is set, only the simplex copying of the information medium is performed. When the duplex copying is set, the duplex scan and flow are performed.

However, when the simplex data is needed, the user frequently gets confused at placing the data page upward or downward. When the user places the data page upward, the output image result is blank. This represents that the image acquiring side is incorrectly placed, and the copying needs to be performed again. Such the unclear indication wastes the user's time and resource.

In order to solve the long-term existing problem, this disclosure provides the technology of facilitating the user's copying, wherein the user can place the information medium on the automatic document feeder and operate in a simple and clear manner to prevent the operation error from occurring again and again.

SUMMARY OF THE INVENTION

It is therefore an object of this disclosure to provide a copying method, and an image acquiring device and a copying system using the same. This disclosure facilitates the user in simply judging the to-be-copied data page using only one finger to make the image acquiring device enable the setting operation to save the resource.

To achieve the above-identified object, this disclosure provides an image acquiring device for selecting one or multiple image acquiring sides of an information medium to be copied. The image acquiring device comprises: an automatic document feeder comprising: an input tray supporting the information medium; and a control panel comprising one or multiple operation buttons for selecting the image acquiring side or sides of the information medium; at least one image acquiring assembly acquiring one or multiple images of the image acquiring side or sides of the information medium; a processor electrically connected to the automatic document feeder, the image acquiring assembly and the operation button or operation buttons; a storage, which is electrically connected to the processor, and comprises at least one image module, which stores program codes for enabling image acquiring and storing operations on the one or multiple images of the image acquiring side or sides of the information medium; and an output unit, which is electrically connected to the processor, and receives and outputs the one or multiple images of the image acquiring side or sides of the information medium. The processor controls the image acquiring assembly to acquire the one or multiple images of the image acquiring side or sides of the information medium according to the program codes and different signals of the operation button or operation buttons on the control panel, and transmits the one or multiple images to the output unit. Different signals of the operation buttons on the control panel may correspond to different image modules for controlling the image acquiring assembly to correspondingly operate. Alternatively, one single image module may be enabled or started at different times to control the to-be-acquired image side(s), and the acquired image side(s) may be stored in the corresponding storage.

This disclosure further provides a copying system for selecting to copy an image of a first side, an image of a second side or the images of the first side and the second side of an information medium. The copying system comprises: an automatic document feeder comprising: an input tray supporting the information medium so that image acquiring and storing operations of the information medium are performed; and a detector detecting presence of the information medium; a control panel using at least one operation button to display images of a first side option, a second side option and a duplex option for setting to perform the image acquiring and storing operations on the first side, the second side and the first side and the second side of the information medium to let a user select a copy mode; and an image acquiring assembly operating according to a corresponding signal outputted based on setting of one of the options of the operation button. The first side option outputs a first signal, the second side option outputs a second signal, and the duplex option outputs a third signal to operate the image acquiring assembly. The first side of the information medium may be the one side (a top side) of the information medium seen by the user, and the second side may be the other side (a bottom side) of the information medium that cannot be seen by the user; and vice versa.

When the detector detects the presence of the information medium on the input tray, the image module setting enters a scan format selecting mode or state. When the detector detects the absence of the information medium on the input tray, the image module setting returns to the original setting state.

This disclosure further provides a copying method of an image acquiring device. The copying method comprises steps of: automatically detecting an information medium disposed in an automatic document feeder; enabling an image side option on the automatic document feeder to enter a standby state; making a user select one or multiple image sides to be copied according to the image side option; transmitting an image side signal, which is generated after the user selects the image side option, to a processor; and enabling, by the processor, a corresponding module to perform a copy operation according to the image side signal.

This disclosure further provides a copying method of an image acquiring device, comprising steps of: using a detector to automatically detect an information medium in an automatic document feeder to generate a detection signal; automatically transporting the information medium and acquiring a duplex image of the information medium according to the detection signal; enabling an image side option on the automatic document feeder to enter a standby state; making a user select one or multiple image sides to be copied according to the image side option; transmitting an image side signal, which is generated after the user selects the image side option, to a processor; and enabling, by the processor, a corresponding module to perform a copy operation according to the image side signal.

This disclosure provides a copying method and a peripheral system using the copying method to facilitate the user in directly and instinctively selecting the image side(s) to be copied according to the images. Thus, it is possible to prevent the to-be-copied data page from being incorrectly placed on the input tray, and to achieve the human-oriented, environment protective and source saving effects.

Further scope of the applicability of this disclosure will become apparent from the detailed description given hereinafter. However, it should be understood that the detailed description and specific examples, while indicating preferred embodiments of this disclosure, are given by way of illustration only, since various changes and modifications within the spirit and scope of this disclosure will become apparent to those skilled in the art from this detailed description.

BRIEF DESCRIPTION OF THE DRAWINGS

This disclosure will become more fully understood from the detailed description given hereinbelow and the accompanying drawings which are given by way of illustration only, and thus are not limitative of this disclosure.

FIG. 6b is a schematic view showing an operation interface in a copying method according to a tenth embodiment of this disclosure.

DETAILED DESCRIPTION OF THE INVENTION

This disclosure will be apparent from the following detailed description, which proceeds with reference to the accompanying drawings, wherein the same references relate to the same elements.

Figure 1:
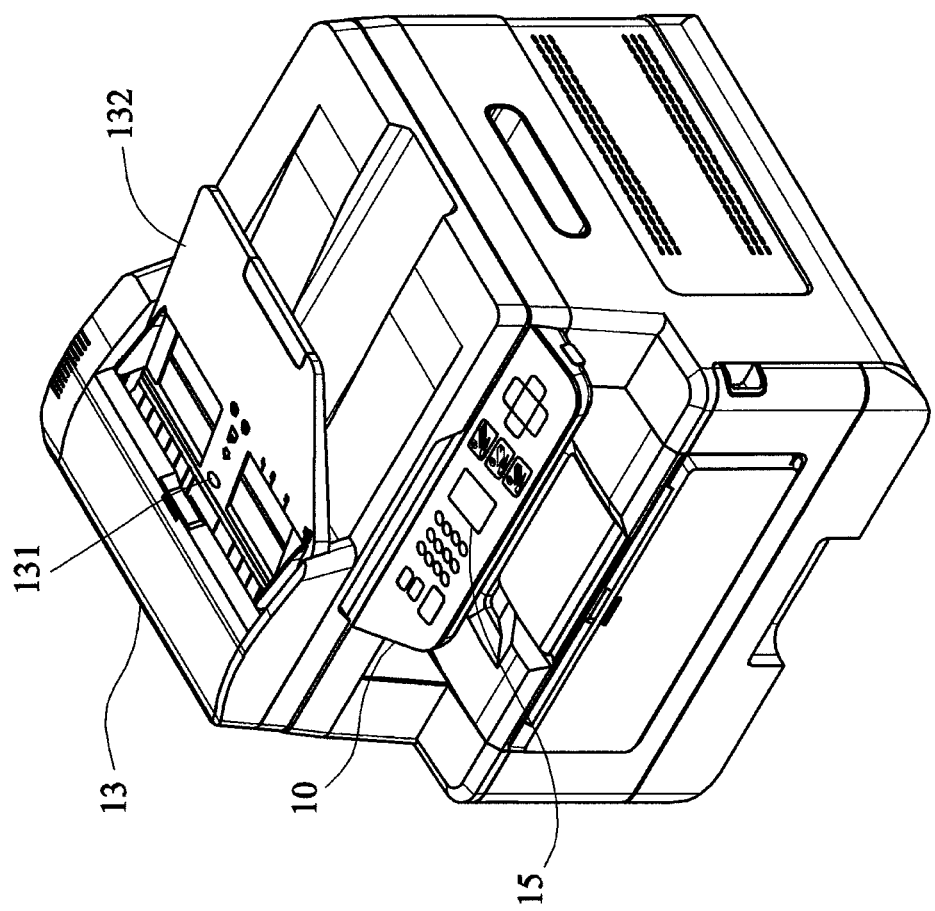
FIG. 1 shows a peripheral electronic device having an automatic document feeder according to this disclosure.
Figure 1A:
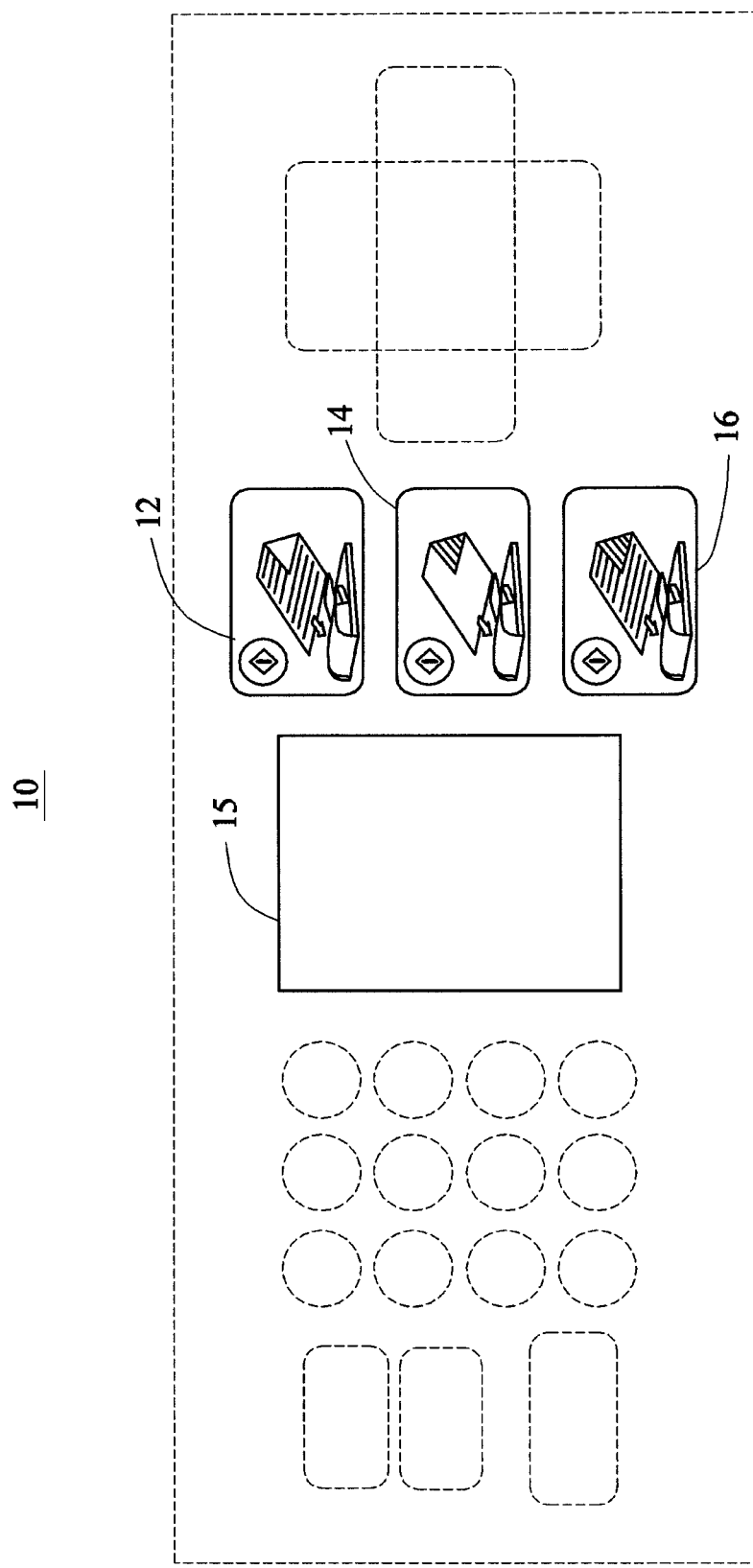
FIG. 1a is a schematic view showing an operation interface in a copying method according to a first embodiment of this disclosure.
Figure 2A:
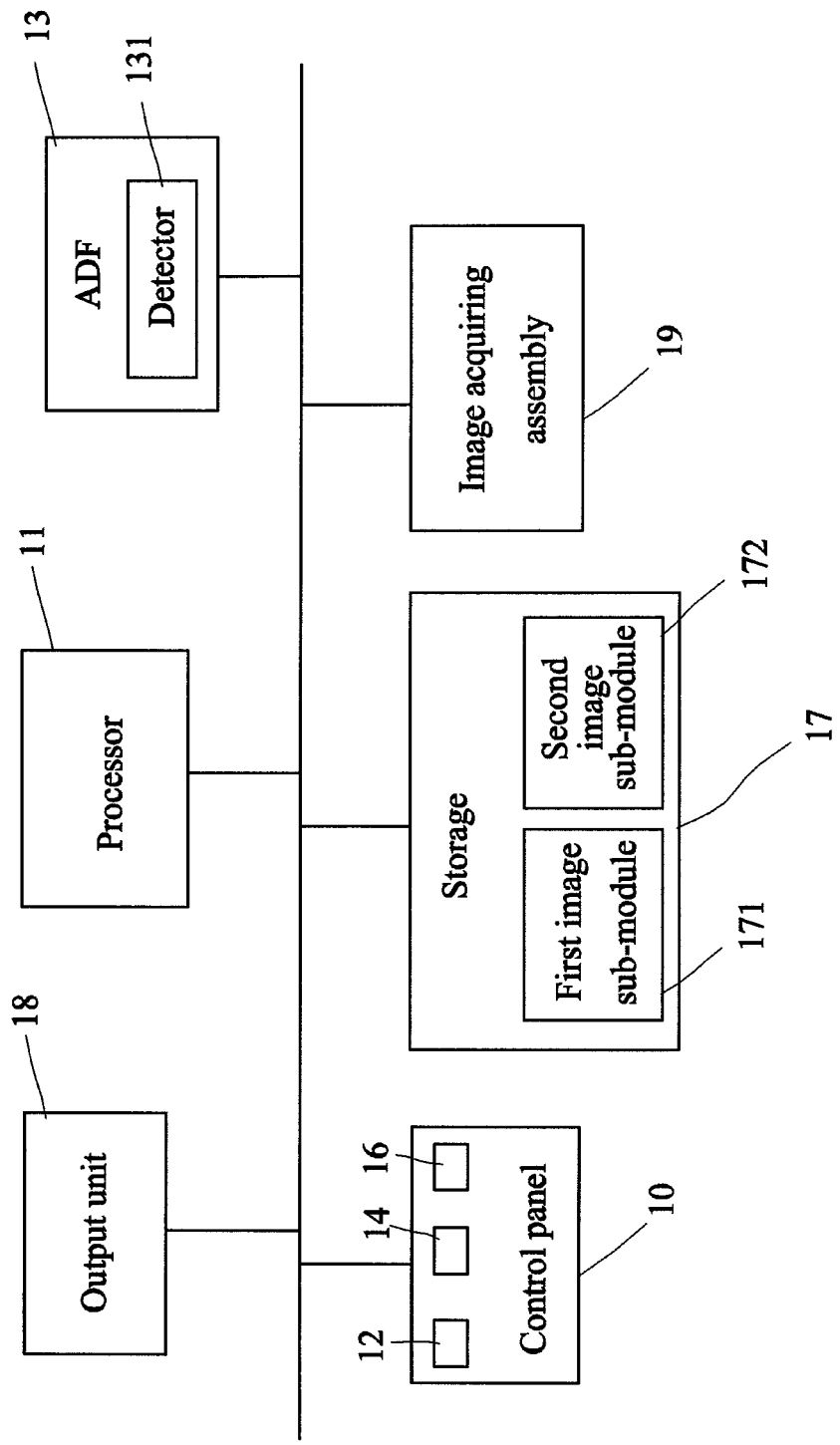
FIGS. 2a and 2b are system block diagrams showing a copying method according to this disclosure.
Figure 2B:
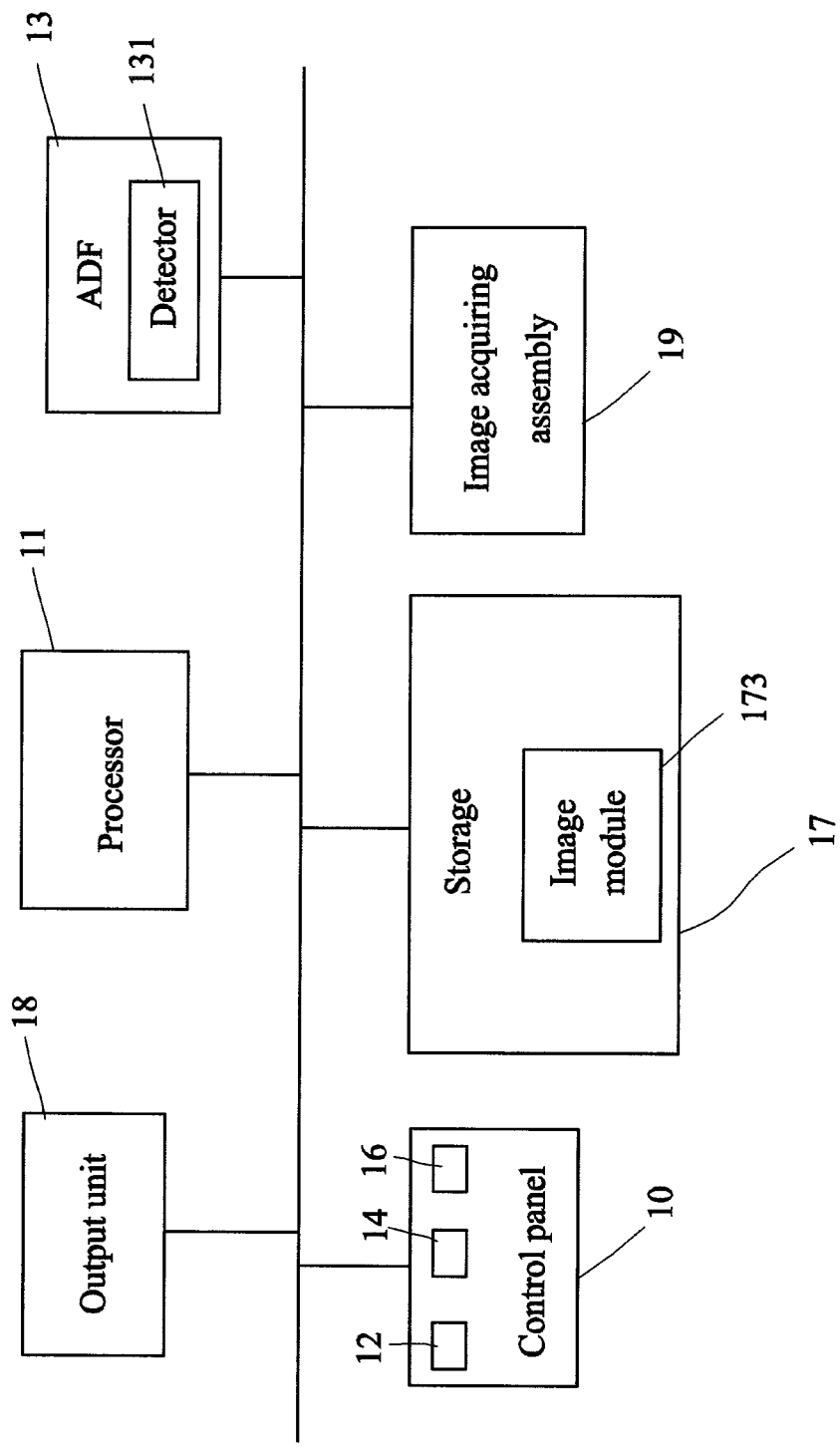

Please refer to FIGS. 1, 1a, 2a and 2b. FIG. 1 shows a peripheral electronic device having an automatic document feeder according to this disclosure. FIG. 1a is a schematic view showing an operation interface in a copying method according to a first embodiment of this disclosure. FIGS. 2a and 2b are system block diagrams showing a copying method according to this disclosure. This disclosure provides a copying method. When a user uses an input tray 132 disposed on an automatic document feeder (ADF) 13 of a peripheral electronic device 1 and places an information medium on the input tray 132 to perform a copy operation on the information medium (to copy the information medium), the copying method selects the option data of copying a first side, a second side or both sides (the first and second sides) of the information medium to operate. The peripheral electronic device 1 comprises the automatic document feeder 13, a control panel 10, a processor 11, a storage 17 and an output unit 18. The automatic document feeder 13 comprises the input tray 132 for supporting the information medium. The control panel 10 comprises operation buttons 12, 14 and 16 for selecting one or multiple image acquiring sides (the image sides, the data pages or the printed sides wanted by the user) of the information medium. The processor 11 (see FIG. 2a) is connected to the automatic document feeder 13, an image acquiring assembly 19 and the operation buttons 12, 14 and 16. The storage 17 is electrically connected to the processor, and comprises at least one image module 173, which stores program codes for enabling the image acquiring and storing operations on the one or multiple images of the image acquiring side or sides of the information medium. The output unit 18, which may be an output port, is electrically connected to the processor 11, and receives and outputs the one or multiple images of the image acquiring side or sides of the information medium. The processor 11 controls the image acquiring assembly 19 to acquire the one or multiple images of the image acquiring side or sides of the information medium according to the program codes and different signals of the operation buttons 12, 14 and 16 on the control panel 10, and transmits the image or images to the output unit 18.

The different signals outputted by the operation buttons 12, 14 and 16 on the control panel 10 correspond to different image sub-modules 171 and 172 and the image module 173 or different image acquiring sub-assemblies of the image acquiring assembly 19. The output unit 18 comprises a printer, a fax machine, an external storage transmission port or a network transmission port. It is worth noting that the peripheral electronic device 1 may be generalized as an image acquiring device. In this case, the output unit 18 may not be a printer or a fax machine, or is even omitted. So, the copying method of the image acquiring device does not necessarily comprise outputting the information medium in the form of a physical copy.

The automatic document feeder 13 further comprises a detector 131, which is disposed at an input end of the input tray 132 and detects whether the information medium is present. When the detector 131 detects the presence of the information medium, the configuration of the copying method starts. The option of the above-mentioned image acquiring side(s) of the information medium may be a first side operation button 12 corresponding to the first side of the information medium, a second side operation button 14 corresponding to the second side of the information medium, or a duplex operation button 16 corresponding to the first side and the second side. The operation buttons may also be presented as options on a display. In one embodiment, when the detector 131 detects the information medium, setting options of the image acquiring side(s) of the image module are enabled. In the fifth embodiment of FIG. 3, an option corresponds to an image sub-module. For example, the first side operation button 12 is set to transmit a first signal to the processor 11 to enable a first portion of the program codes stored in a first image sub-module 171 to control the image acquiring assembly to acquire the image of the first side (top side) of the information medium; the second side operation button 14 is set to transmit a second signal to the processor 11 to enable a second portion of the program codes stored in a second image sub-module 172 to control the image acquiring assembly to acquire the image of the second side (bottom side) of the information medium; and the duplex operation button 16 is set to transmit a third signal to the processor 11 to enable the program codes of the first image sub-module 171 and the second image sub-module 172 to control the image acquiring assembly to acquire the images of the both sides (top and bottom sides) of the information medium. Of course, this embodiment may directly enter the mode of setting the image acquiring side as the user triggers the operation buttons of the image acquiring side(s) without the provision of the detector for detecting the presence of the information medium.

In another embodiment, when the detector detects the presence of the information medium, the setting options of the image acquiring side(s) are enabled. In the fifth embodiment of FIG. 3, the selection of the image acquiring side(s) of the information medium on the control panel is controlled by one single image module 173 without being established by multiple image sub-modules. For example, the first side operation button 12 is set to transmit the first signal and start the single image module 173 (loading the program codes) to start a first image acquiring sub-assembly 23 at a first time point t1 to scan the first side (top side) of the information medium; the second side operation button 14 is set to transmit the second signal and start the single image module 173 to start a second image acquiring sub-assembly 25 at a second time point t2 to scan the second side (bottom side) of the information medium; and the duplex operation button 16 is set to transmit the third signal and start the single image module 173 to start the first image acquiring sub-assembly 23 at the first time point t1 and to start the second image acquiring sub-assembly 25 at the second time point t2 to scan the both sides (top and bottom sides) of the information medium. Of course, this embodiment can directly enter the mode of setting the image acquiring side as the image side operation button is triggered without the provision of the detector for detecting the presence of the information medium.

Once the copying method starts, the information medium starts to enter the sheet passage, wherein the transporting of the information media may start from the topmost or bottommost information medium.

The first side operation button 12, the second side operation button 14 and the duplex operation button 16 are used to let the user clearly identify the image acquiring side(s) of the data page to be selected without the confusion that the data page is disposed on the input tray with the image acquiring side facing upward or downward. The duplex operation button 16 may be presented in the form of a text, texts, a graphic or a combination of texts and graphic. For example, in this embodiment, the first side operation button 12, the second side operation button 14 and the duplex operation button 16 are commonly expressed in the form of graphic and texts, which may also be regarded as a graphic. Thus, the image acquiring side to be operated is clearly indicated, and the timesaving and environment protective effects can be achieved.

In this embodiment, three operation buttons are provided. The first side operation button 12 is used to transmit the first signal, and the corresponding function thereof is to acquire the image of the first side of the information medium. The second side operation button 14 is used to transmit the second signal, and the corresponding function thereof is to acquire the image of the second side of the information medium. The duplex operation button 16 is used to transmit the third signal, and the corresponding function thereof is to acquire the duplex image of both sides of the information medium. For instance, the first side is a top side (side up) of the information medium, the second side is a bottom side (side down) of the information medium, and the both sides are the both sides (top and bottom sides) of the information medium. It is worth noting that a single operation button can be used to replace three operation buttons, wherein the single operation button can transmit three different signals to let the processor start acquiring and storing the image(s) of the first side, the second side or the first side and the second side of the information medium in the image module. For example, pressing the operation button one time indicates that the first side is acquired, pressing the operation button two times indicates that the second side is acquired, and pressing the operation button three times indicates that the first side and the second side are acquired. Alternatively, continuously pressing the operation button to output a prompt tone indicates that the first side is acquired, continuously pressing the operation button to output two prompt tones indicates that the second side is acquired, and continuously pressing the operation button to output three prompt tones indicates that the first and second sides are acquired.

Figure 1B:
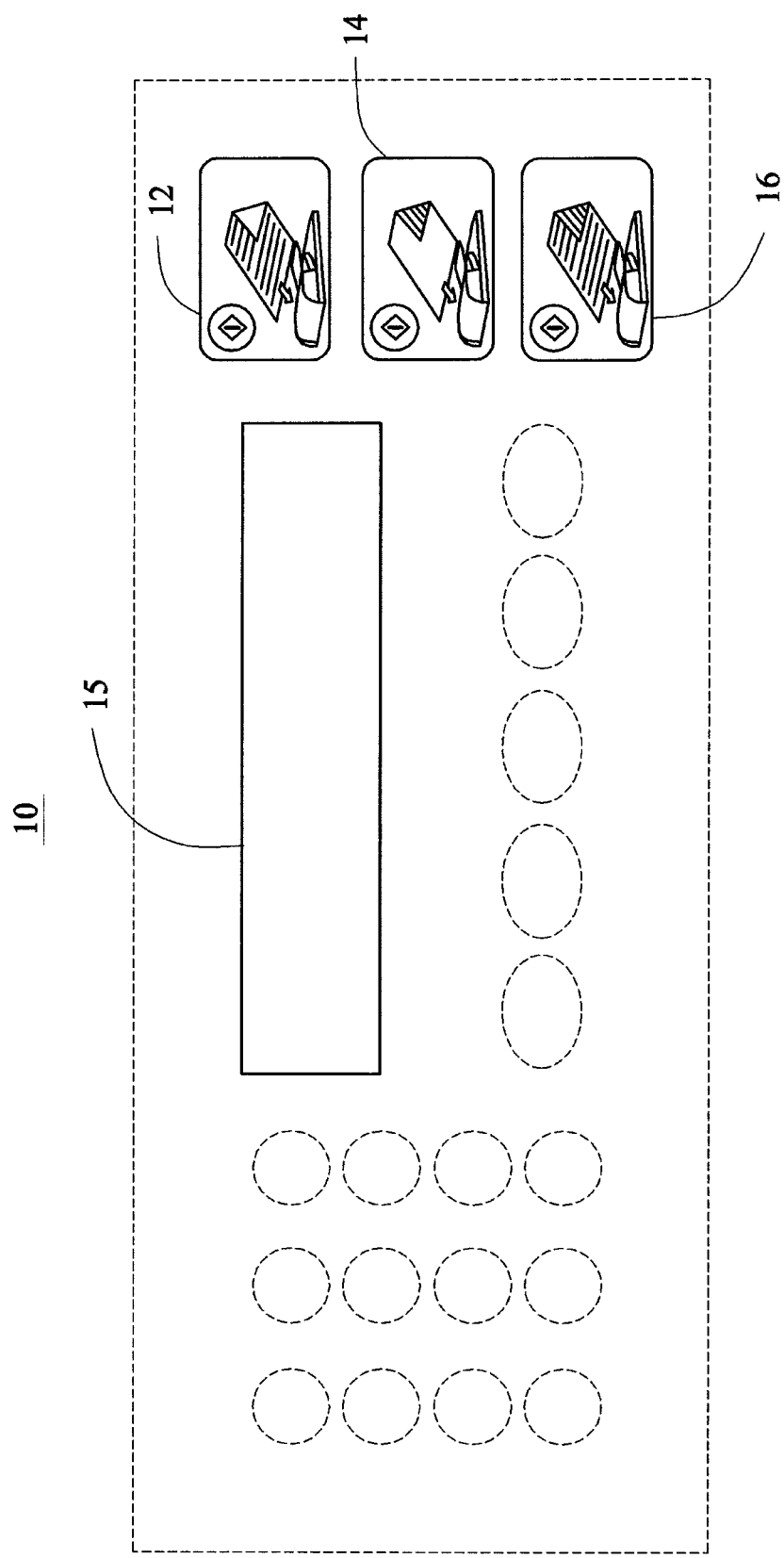
FIG. 1b is a schematic view showing an operation interface in a copying method according to a second embodiment of this disclosure.

FIG. 1b is a schematic view showing an operation interface in a copying method according to a second embodiment of this disclosure. In FIG. 1b, the first side operation button 12, the second side operation button 14 and the duplex operation button 16 of the information medium are commonly expressed by the graphic and the texts. Although a panel 15 is long and narrow and can only display the texts, the operation of the user of selecting the image acquiring side(s) of the information medium is not affected.

Figure 1C:
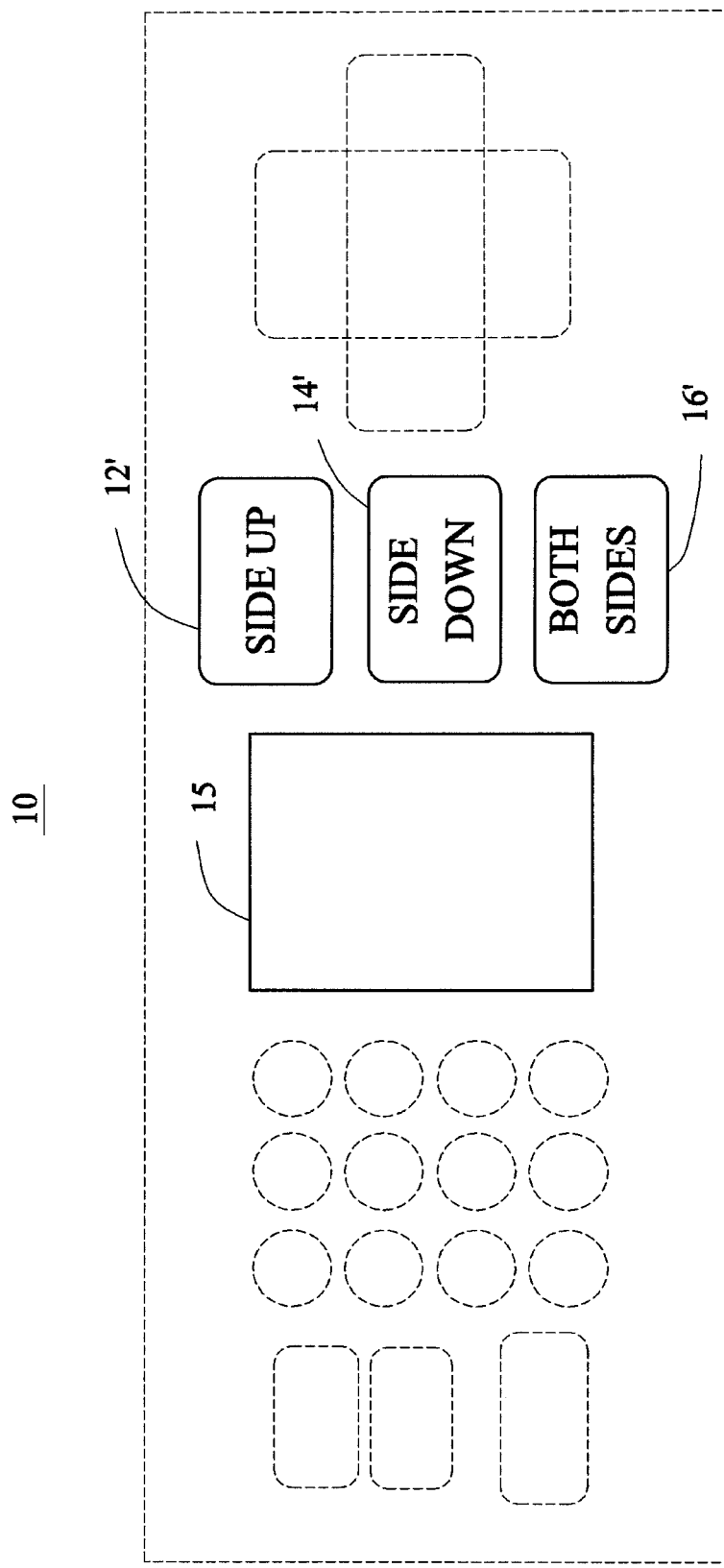
FIG. 1c is a schematic view showing an operation interface in a copying method according to a third embodiment of this disclosure.

Please refer to FIG. 1c. FIG. 1c is a schematic view showing an operation interface in a copying method according to a third embodiment of this disclosure. In this embodiment, a first side operation button 12', a second side operation button 14' and a duplex operation button 16' of the information medium are expressed by the text. After the user clearly selects image acquiring side(s) to be operated according to the indication, the program codes of the corresponding image module are loaded to start operating.

Figure 1D:
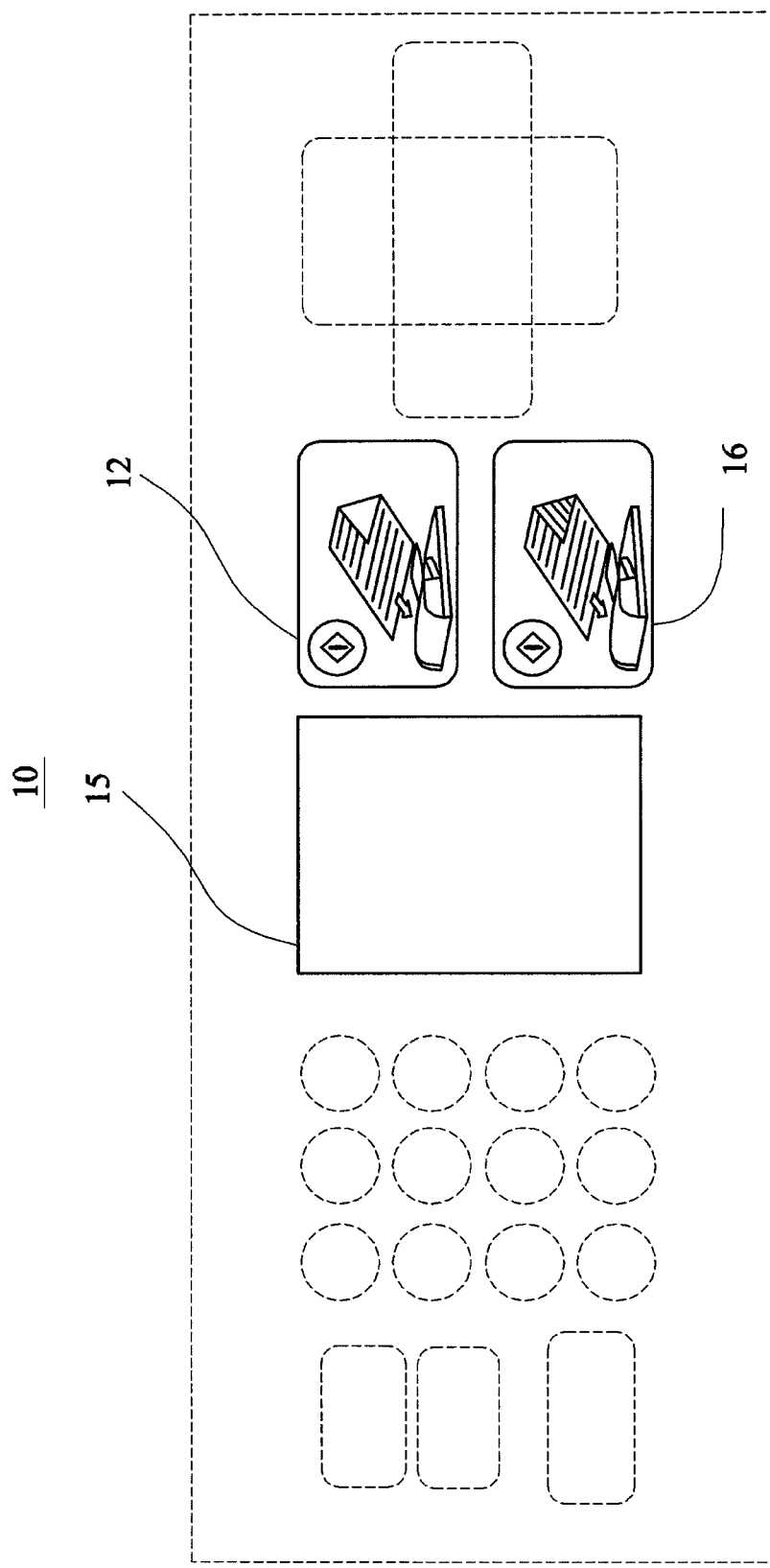
FIGS. 1d to 1f are schematic views showing operation interfaces in a copying method according to a fourth embodiment of this disclosure.
Figure 1E:
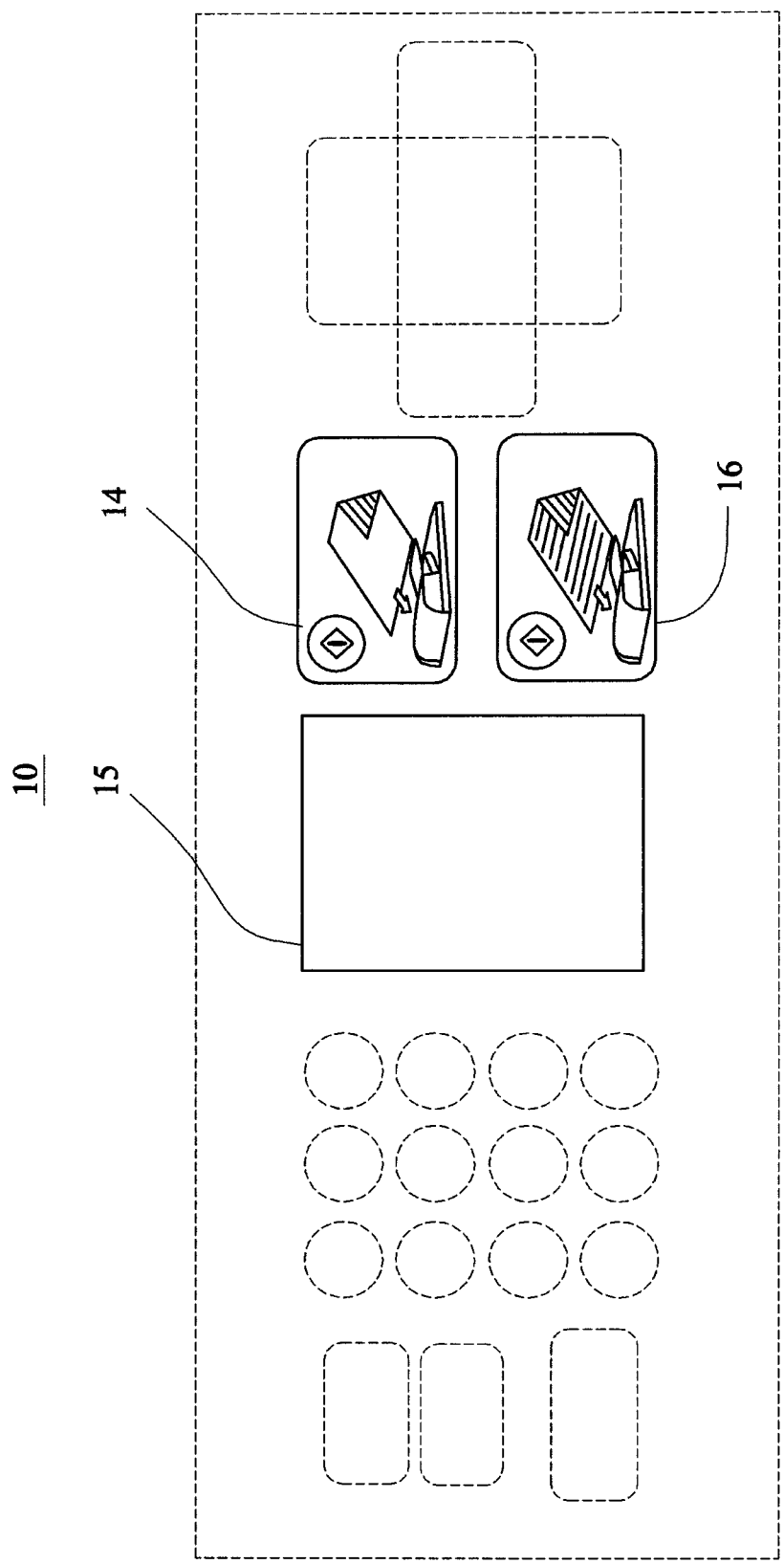
Figure 1F:
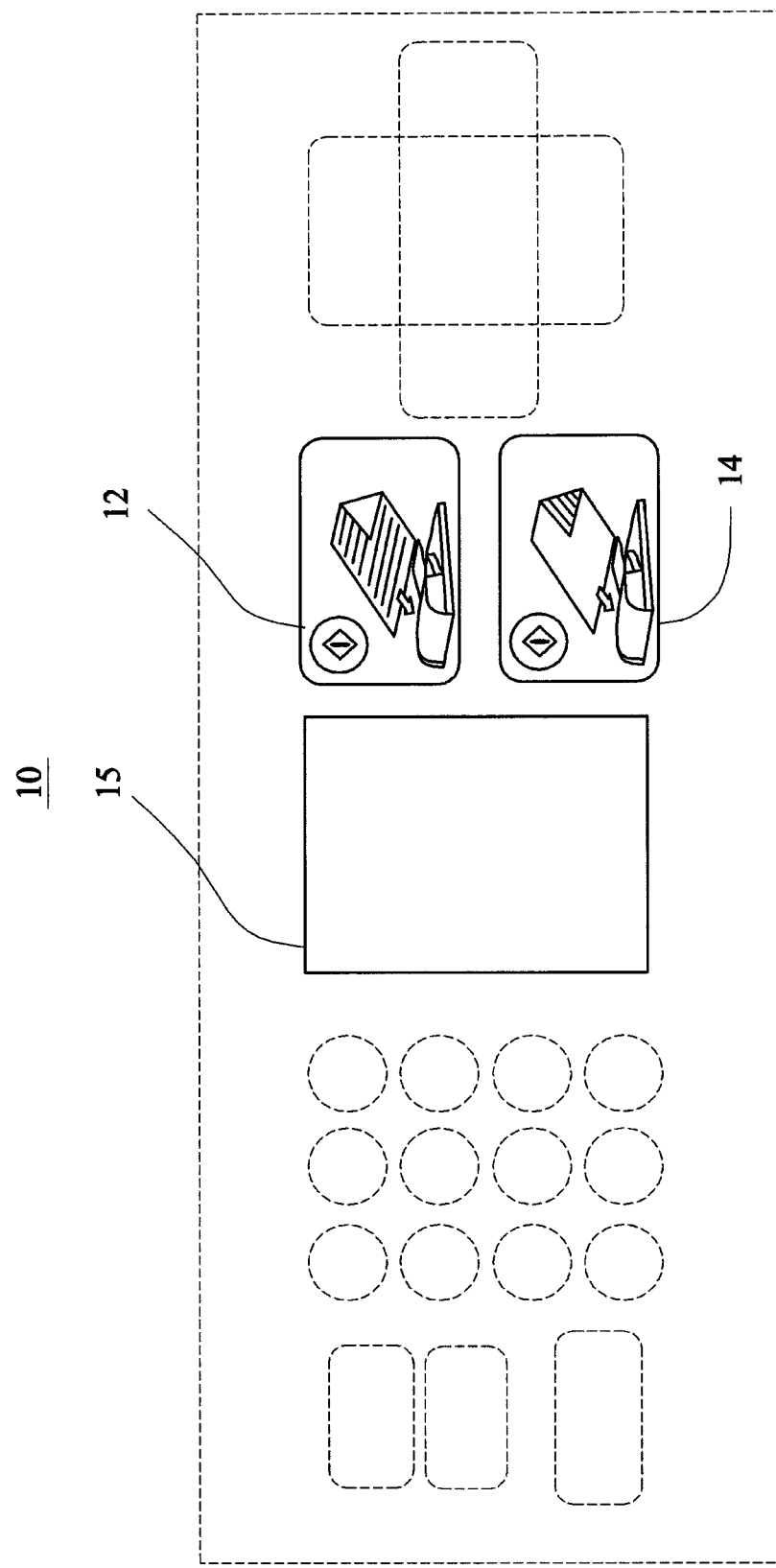

FIGS. 1d to 1f are schematic views showing operation interfaces in a copying method according to a fourth embodiment of this disclosure. Please refer to FIG. 1d, in this embodiment, the keys on the control panel 10 are used to operate the image acquiring side(s) of the information medium, wherein the options of the image acquiring sides correspond to the first side operation button 12 and the duplex operation button 16, and control the image acquiring side(s) of the information medium. If the user wants to acquire the simplex image (top side) of the information medium, then the user places the image side facing upward, and presses the first side operation button 12. Then, the electronic device performs the simplex image acquiring of the information medium with the image side facing upward. If the user wants to acquire the duplex data image, then the user places the information medium arbitrarily, and presses the duplex operation button 16 so that the electronic device performs the duplex image acquiring.

Please refer to FIG. 1e, in this embodiment, the operation buttons on the control panel 10 are used to operate the image acquiring side(s) of the information medium, wherein the options of the image acquiring sides correspond to the second side operation button 14 and the duplex operation button 16, and control the image acquiring side(s) of the information medium. If the user wants to scan the simplex image (bottom side) of the information medium, then the user places the image side facing downward, and presses the second side operation button 14 so that the electronic device performs the simplex image acquiring of the information medium with the image side facing downward. The technical contents of acquiring the duplex image data are shown in FIG. 1d.

Please refer to FIG. 1f, in this embodiment, the operation buttons on the control panel 10 are used to operate the image acquiring side(s) of the information medium, wherein the options of the image acquiring sides correspond to the first side operation button 12 and the second side operation button 14, and control the image acquiring side(s) of the information medium. If the user wants to scan a top side of the information medium, then the user places the image side facing upward, and presses the first side operation button 12 so that the electronic device performs the simplex image acquiring of the information medium with the image side facing upward. If the user wants to scan a bottom side of the information medium, then the user places the image side facing downward, and presses the second side operation button 14 so that the electronic device performs the simplex image acquiring of the information medium with the image side facing downward. If the user wants to scan the top and bottom sides of the information medium, then the user places the image side arbitrarily, and presses the first side operation button 12 and the second side operation button 14 in the same time period so that the electronic device performs the duplex image acquiring. The user may firstly keep pressing one of the operation buttons, and then press the another operation button to provide the duplex scan indication. Alternatively, the user may press and release one of the operation buttons, and then press another operation button again within a predetermined time (e.g., 2 seconds). At this time, the predetermined time set by the electronic device has not elapsed, and the electronic device starts to perform the duplex scan. If another operation button is not pressed within the predetermined time, then only the simplex scan is performed. Alternatively, after the user presses and releases one of the operation buttons, the electronic device immediately starts the scan. However, the information medium is still being transported on the way or the electronic device is still warming up, so the user has the sufficient time to press another operation button again as long as the image acquiring assembly 19 can timely perform the duplex scan.

At least one of the operation buttons of the first to third embodiments is electrically connected to a simplex image acquiring sub-assembly (such as symbol 33 in FIG. 3a) facing upward or downward when the information medium is disposed in or on the input tray 132, and another one of the operation buttons is electrically connected to duplex image acquiring sub-assemblies (e.g., symbols 23 and 25 in FIG. 3) of the image acquiring assembly. This disclosure provides a way of making the user conveniently and clearly know how to place the information medium with the data page facing the correct image acquiring side to prevent the try and error.

Figure 3:
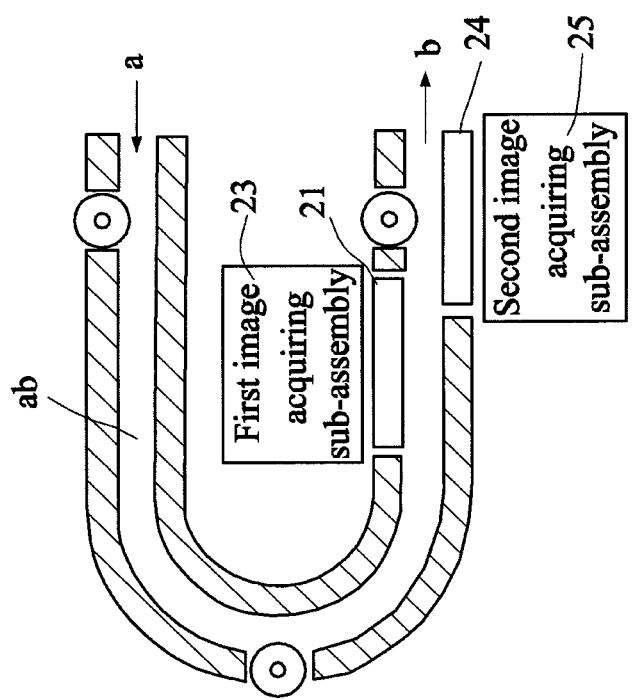
FIG. 3 is a schematic view showing a copying system according to a fifth embodiment of this disclosure.

Please refer to FIG. 3. FIG. 3 is a schematic view showing a copying system according to a fifth embodiment of this disclosure. In this embodiment, an image acquiring sub-assembly is disposed on each of two sides of the passage of the sheet-feeding mechanism assembly 20. So, the copying system of this embodiment comprises a first image acquiring sub-assembly 23 and a second image acquiring sub-assembly 25. This disclosure further provides a copying system for selecting to copy an information medium using the first side operation button 12, the second side operation button 14 or the duplex operation button 16. The copying system comprises: an automatic document feeder 13 comprising an input tray 132 for supporting an information medium or information media, on which scanning (image acquiring) and storing operations are to be performed; a control panel 10 using one or multiple operation buttons 12, 14 and 16 to display images of a first side option, a second side option and a duplex option, which provide copy modes to be selected by the user for the setting to perform the image acquiring and storing operations on the first side, the second side and the first side and the second side of the information medium, wherein an image acquiring assembly operates according to a corresponding signal outputted by the setting of the option of the operation button. The first side operation button 12 (corresponding to the first side option) outputs a first signal, the second side operation button 14 (corresponding to the second side option) outputs a second signal, and the duplex operation button 16 (corresponding to the duplex option) outputs a third signal (duplex acquiring signal) to the processor, so that the processor controls the image acquiring assembly to operate (acquire the image/images of the first side and/or the second side of the information medium). The operations of the image acquiring assembly further comprise acquiring the image of the first side at a first time point t1, or/and acquiring the image of the second side at a second time point t2.

The image acquiring assembly further comprises the first image acquiring sub-assembly 23 for acquiring the image of the first side of the information medium, and the second image acquiring sub-assembly 25 for acquiring the image of the second side of the information medium. The processor controls the first image acquiring sub-assembly 23 to operate at the first time point t1; and controls the second image acquiring sub-assembly 25 to operate at the second time point t2.

In this embodiment, when the third signal is enabled, the operations at the first time point t1 and the second time point t2 are mutually independent from each other. If the first image acquiring sub-assembly 23 and the second image acquiring sub-assembly 25 are disposed opposite each other, the first time point t1 is different from the second time point t2 due to the design of the image acquiring technology.

In another technical solution, the user can select a copy mode, a first image sub-module 171 corresponds to the first signal of the first side operation button 12 and a second image sub-module 172 corresponds to the second signal of the second side operation button 14 of the information medium. Different signals of the operation buttons on the operation panel correspond to different image modules 171 and/or 172.

When the detector detects the presence of the information medium, the information medium is transported to a passage "ab" between the passage ports "a" and "b" and the image acquiring is performed. The control panel 10 displays or configures images or texts representing the first side operation button 12, the second side operation button 14 and the duplex operation button 16 copying the information medium to provide copy modes to be selected by the user. The first image sub-module 171 enables the first image acquiring sub-assembly 23 to perform the image acquiring of the first side operation button 12 through a first light-permeable window 21 when the processor correspondingly detects the first signal of the first side operation button 12 for copying the information medium. The second image sub-module 172 enables the second image acquiring sub-assembly 25 to perform the image acquiring of the second side operation button 14 through a second light-permeable window 24 when the processor correspondingly detects the second signal of the second side operation button 14 for copying the information medium. When the detector detects the presence of the information medium on the input tray, the setting and selecting mode is entered. When the image acquiring of the information medium is finished, the detector on the input tray does not detect the presence of the information medium on the input tray. At this time, the selecting mode is set back to the original state. The image acquiring methods of the first image sub-module 171 and the second image sub-module 172 are mutually independent from each other. It is also possible to use the same image module 173 but different signals for enabling the first image acquiring sub-assembly 23 and the second image acquiring sub-assembly 25 at different time points to perform the image acquiring and storing operations.

The same effect may be achieved in another embodiment, wherein the image acquiring assembly comprises the first image acquiring sub-assembly 23 and the second image acquiring sub-assembly 25. The program codes of the first image sub-module 171 control the first image acquiring sub-assembly 23 to perform the image acquiring and storing operations on the first side of the information medium according to the first signal of the first side operation button 12. The program codes of the second image sub-module 172 control the second image acquiring sub-assembly 25 to perform the image acquiring and storing operations on the second side of the information medium according to the second signal of the second side operation button 14. The processor enables the first image acquiring sub-assembly 23 and the second image acquiring sub-assembly 25 at the same time or different times according to the third signal of the duplex option.

When the copying system detects the third signal in this embodiment, the processor enables the first image acquiring sub-assembly 23 and the second image acquiring sub-assembly 25. Regarding the system control, the processor enables the first image sub-module 171 and the second image sub-module 172 at the same time or different times.

Figure 3A:
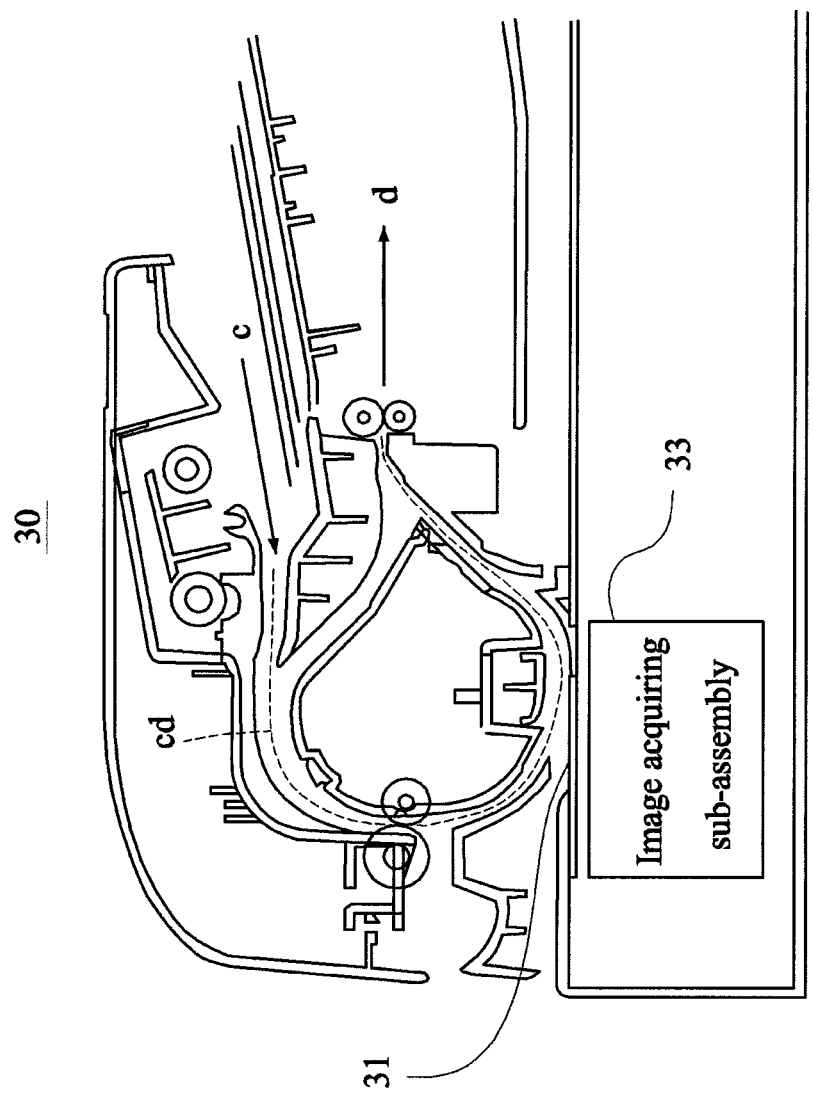
FIGS. 3a and 3b are schematic views showing a copying system according to a sixth embodiment of this disclosure.
Figure 3B:
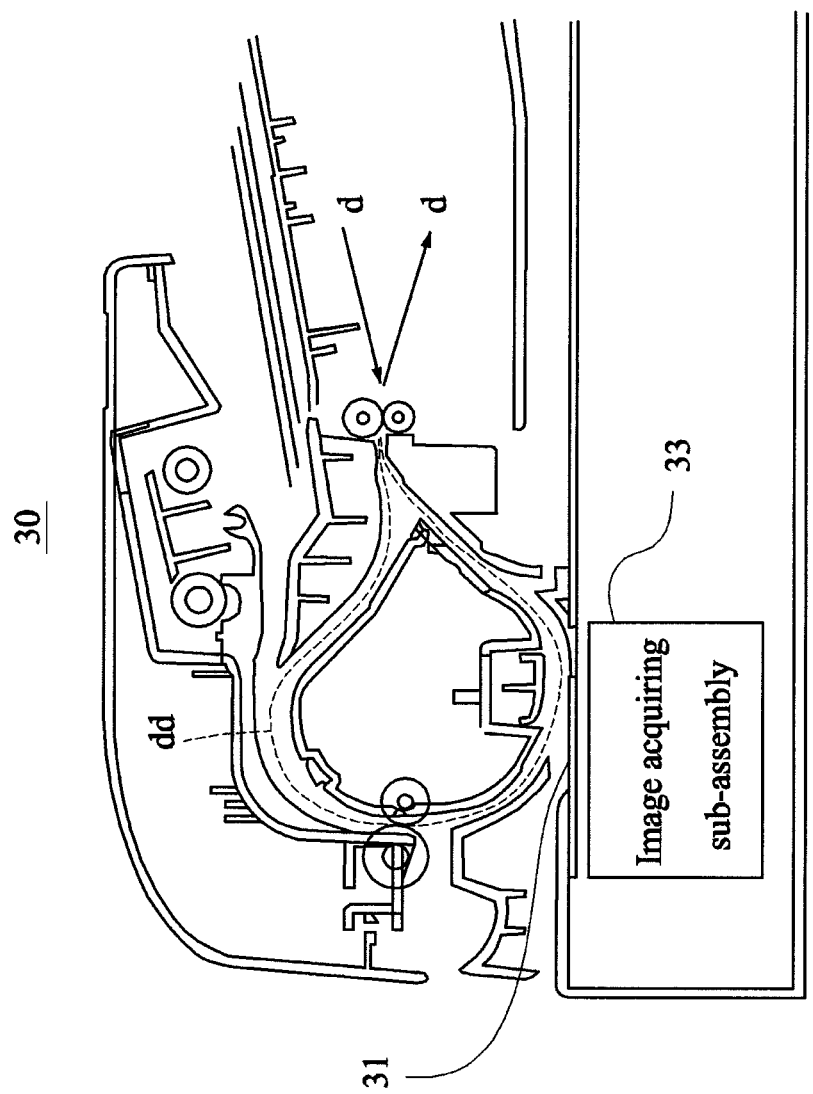

Please refer to FIGS. 3a and 3b. FIGS. 3a and 3b are schematic views showing a copying system according to a sixth embodiment of this disclosure. In this embodiment, an image acquiring sub-assembly 33 is disposed on a passage of a sheet-feeding mechanism assembly 30. So, the operation object of this embodiment is to provide an operation method of the technical contents of a single image acquiring assembly. Thus, this disclosure further provides a copying system using the first side operation button 12, the second side operation button 14 or the duplex operation button 16 to select to copy an information medium. The copying system comprises: an automatic document feeder 13 comprising an input tray 132 for supporting an information medium or information media to be acquired; a control panel 10 using the operation buttons 12, 14 and 16 to display the texts or images of the first side image option, the second side image option and the duplex image option for setting to perform the image acquiring and storing operations on the first side, the second side and the first side and the second side of the information medium to provide copy modes to be selected by the user. The image acquiring assembly operates according to a corresponding signal outputted based on setting of one of the options of the operation buttons. The first side operation button 12 outputs a first signal, the second side operation button 14 outputs a second signal, and the duplex operation button 16 outputs a third signal to operate the image acquiring assembly. The operation of the image acquiring assembly further comprises acquiring the image of the first side at the first time point t1, or acquiring the image of the second side at the second time point t2.

In the above-mentioned paragraph, if the control panel utilizes the technique of FIG. 1d or 1e, then similar effects still can be achieved. So, this disclosure further provides a copying system using a duplex operation button 16, and the first or second side operation button 12 or 14 to select to copy the information medium. The copying system comprises: an automatic document feeder 13 comprising an input tray 132 for supporting an information medium to be acquired; a control panel 10 using a duplex operation button 16 and at least one operation button 12 or 14 for displaying the image-acquiring side facing upward or downward to display the texts or images of the first side image option, the second side image option and the duplex image option for setting to perform the image acquiring and storing operations on the first side, the second side and the first side and the second side of the information medium to provide copy modes to be selected by the user. The image acquiring sub-assembly operates according to a corresponding signal outputted based on setting of one of the options of the operation buttons. The first side operation button 12 outputs a first signal or the second side operation button 14 outputs a second signal, and the duplex operation button 16 outputs a third signal to the processor, so that the processor controls the image acquiring assembly to operate. The operation of the image acquiring assembly further comprises acquiring the image of the first side at the first time point t1, or acquiring the image of the second side at the second time point t2.

At the first time point t1 and the second time point t2, the processor controls the image acquiring sub-assembly to operate to acquire the duplex image of both sides of the information medium through different input paths.

This disclosure further provides a copying system using the first side operation button 12, the second side operation button 14 or the duplex operation button 16 to select to copy the information medium. The copying system comprises: a detector for detecting the information medium on the input tray, wherein when the detector detects presence of the information medium, the information medium is transported to the passage "cd" between the passage ports "c" and "d" and the passage "dd" between the passage ports "d" and "d" for image acquiring; a control panel 10 using the first side operation button 12, the second side operation button 14 and the duplex operation button 16 to provide copy modes to be selected by the user; a first image sub-module 171 for correspondingly detecting the first signal of the first side operation button 12 to enable the image acquiring sub-assembly 33 to acquire the image of the information medium in the passage "cd" through a light-permeable window 31 at the first time point t1; a second image sub-module 172 for correspondingly detecting the second signal of the second side operation button 14 to enable the image acquiring sub-assembly 33 to acquire the image of the information medium on the passage "dd" through the light-permeable window 31 at the second time point t2. When the processor detects the duplex operation button 16 as being pressed, the processor loads the program codes to operate the first image sub-module and the second image sub-module at the same time or different times.

The program codes of the first image sub-module 171 can enable the image acquiring sub-assembly 33 to acquire the image of the information medium in the passage "cd" through the light-permeable window 31. The program codes of the second image sub-module 172 can enable the image acquiring sub-assembly 33 to acquire the image of the information medium, which is discharged from, fed into and further flipped over and discharged from the passage port d (passage "dd") through the light-permeable window 31. It can be obtained that when the first image sub-module 171 is enabled (the processor loads its program codes), the image acquiring sub-assembly 33 operates as the information medium passes through the passage "cd"; and when the second image sub-module 172 is enabled (the processor loads its program codes), the image acquiring sub-assembly 33 is disabled when the medium passes through the passage "cd", and is enabled to acquire the image data of the side of the information medium facing downward when the medium passes through the passage "dd".

When the copying system detects the third signal, the information medium firstly passes through the path of the passage "cd" to make the enabled image acquiring sub-assembly 33 acquire the image of the first side of the information medium; and then passes through the path of the passage "dd" from the passage port d (outlet) to make the enabled image acquiring sub-assembly 33 acquire the image of the second side of the information medium. Thus, the images of the both sides of the information medium can be acquired. So, the image acquiring sub-assembly 33 operates twice in this embodiment.

Figure 4:
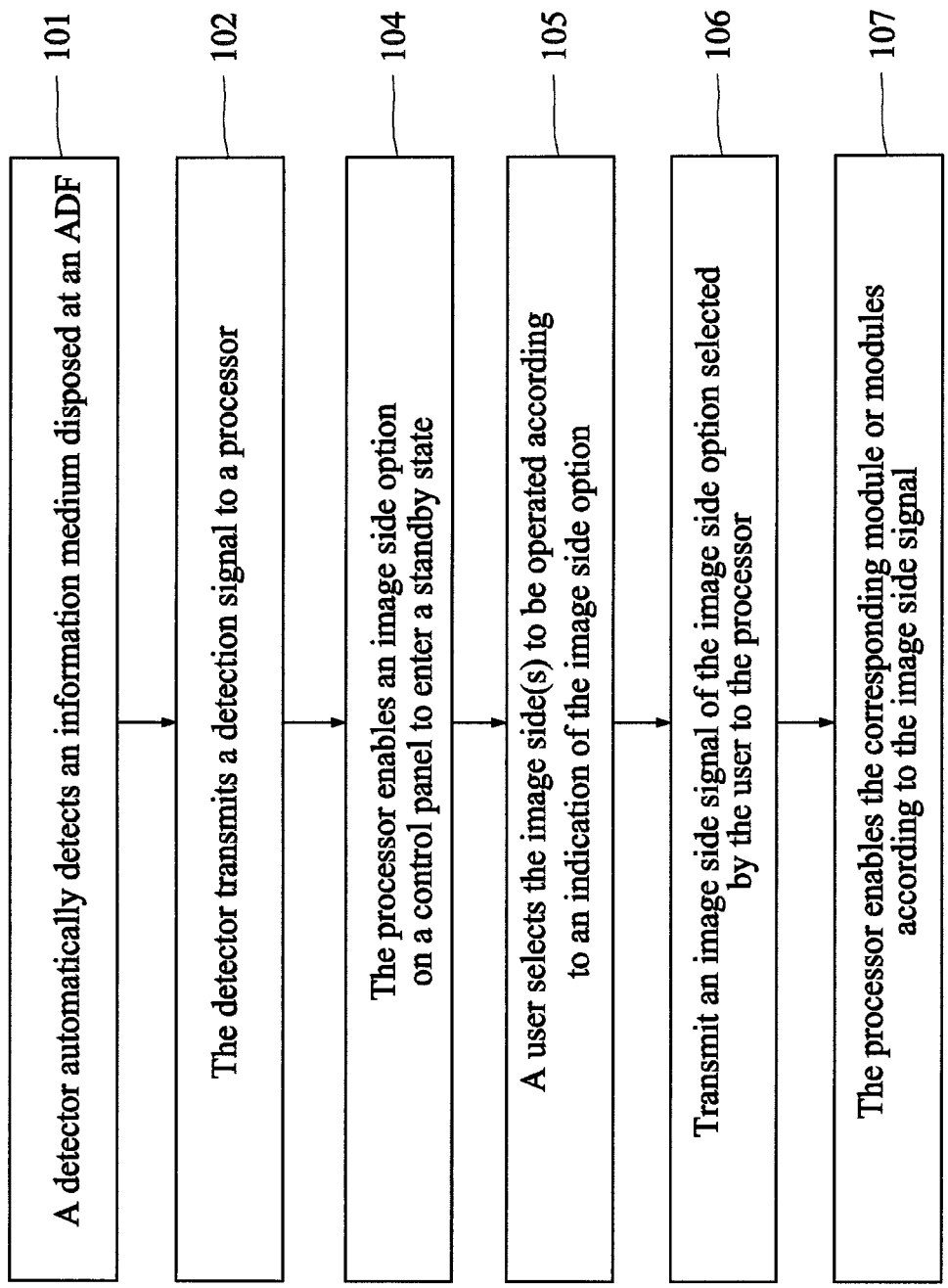
FIG. 4 is a flow chart showing a copying method of a peripheral electronic device according to a seventh embodiment of this disclosure.

Please refer to FIG. 4, FIG. 4 is a flow chart showing a copying method of a peripheral electronic device according to a seventh embodiment of this disclosure. A detector 131 is disposed at an inlet of the input tray 132 of the automatic document feeder 13. In step 101, the detector automatically detects an information medium disposed at the automatic document feeder. In step 102, the detector transmits a detection signal to the processor. In step 104, the processor enables the image side option on the control panel 10 to enter a standby state. For example, the option is disposed on the touch panel or the indicators of the physical operation button are triggered to emit light or flicker to remind the user to make a selection, wherein these indicators do not emit light or flicker when no information medium is present to save the energy and reduce the light pollution. In step 105, the user selects the image side(s) (image acquiring side(s)) to be operated according to the indication of the image side option. In step 106, the image side signal of the image side option selected by the user is transmitted to the processor. In step 107, the processor enables the corresponding module or modules (e.g. the image extracting module storing the image acquiring program codes, and the printing module storing the printing program codes) according to the image side signal to control the image acquiring (scanning) assembly and printer assembly. Alternatively, the image acquiring (scanning) assembly and the image acquiring program codes may be regarded as a module, or the printer assembly for storing the printing program codes is regarded as another module to perform a copy operation. Of course, the subsequent image acquiring or copying operation of the information medium may also be continued according to the image side signal. In this embodiment, when the user places the information medium in the input tray 132 of the automatic document feeder 13, the detector detects the presence of the information medium and transmits the message to the processor, and the processor correspondingly enables the associated page selecting option of the information medium on the control panel. Thus, the user can clearly obtain which side or sides are to be copied without the try and error.

The image side option is an operation button, operation buttons, an image or images presented on the touch panel. Multiple operation buttons are preferably used. If the image option or graphic option on the touch panel is used, the text(s), image(s) or icon(s) for clearly indicating the first side, the second side or the both sides may be used.

The technological essence of this disclosure is to clearly and instinctively indicate the operation side options. So, the image side options may show at least one option indicating the image acquiring side of the information medium facing upward or downward, and show a duplex option to achieve the effect of this disclosure.

The image side options provide the operation side option to the user, and different options enable different signals to be transmitted to the processor to start the corresponding operation. It can be obtained that if there are two options, then two signals represent the option of copying the image acquiring side of the information medium facing upward or downward, and the duplex copy option, respectively. If there are three options, three signals represent the options of copying the image acquiring sides of the information medium facing upward and downward, and the duplex copy option, respectively. The signals enable the corresponding module or modules or time control method to achieve the corresponding copying requirement. In addition, the image side option may provide the user with multiple options of operation sides, and the options of the operation sides enable different signals to be transmitted to the processor to start the corresponding operations, respectively.

Figure 5:
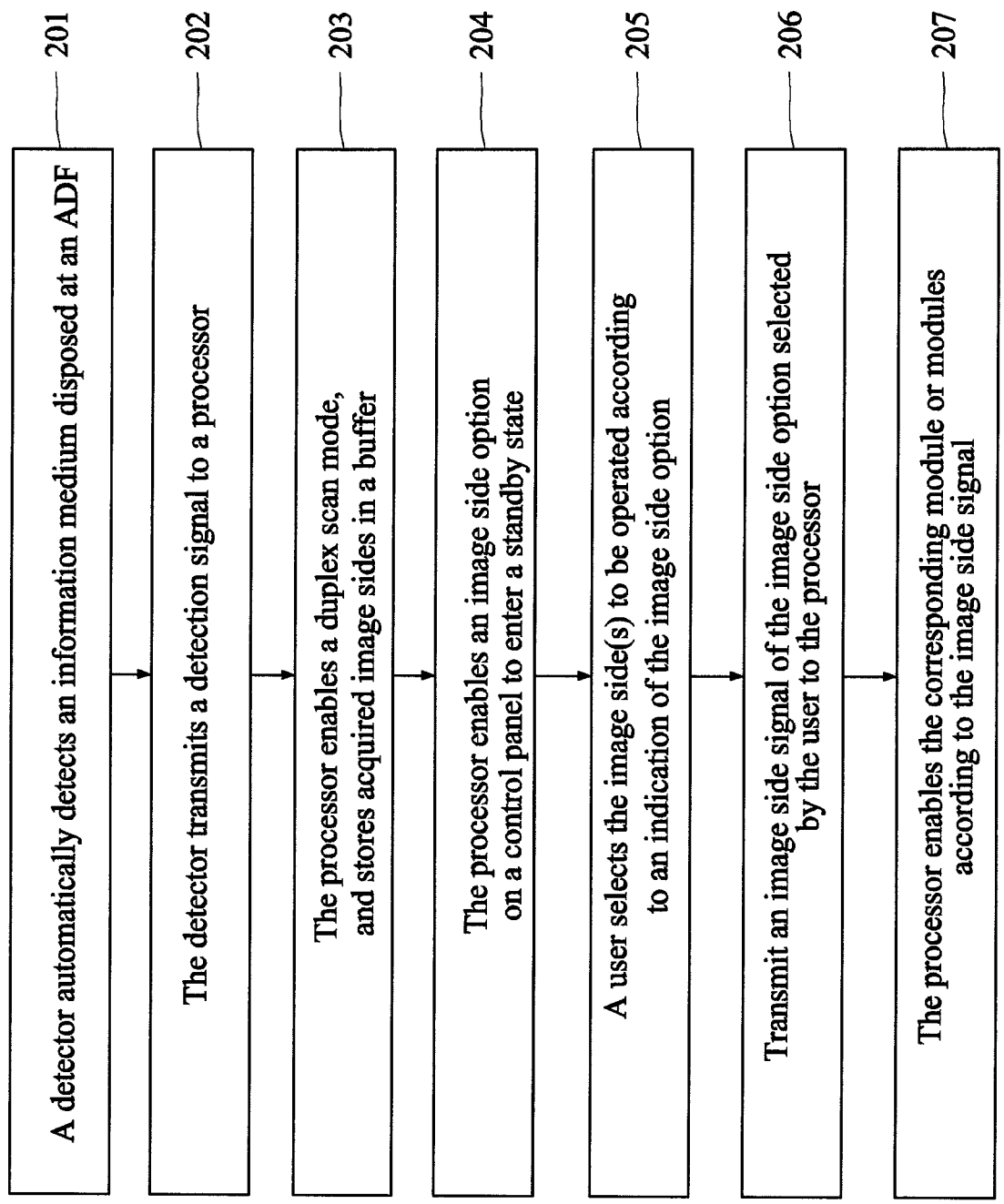
FIG. 5 is a flow chart showing a copying method of a peripheral electronic device according to an eighth embodiment of this disclosure.

Please refer to FIG. 5. FIG. 5 is a flow chart showing a copying method of a peripheral electronic device according to an eighth embodiment of this disclosure. A detector is disposed at an inlet of the input tray 132 of the automatic document feeder 13. In step 201, the detector automatically detects the presence of a document of an information medium disposed at the automatic document feeder. In step 202, the detector transmits the detection signal to the processor. In step 203, the processor enables the duplex scan mode, and stores the acquired image sides (e.g., the images of the first and second sides) in the buffer of the image acquiring device. In step 204, the processor enables the image side option on the control panel 10 to enter a standby state. In step 205, the user selects one or multiple image sides to be copied according to the indication of the image side option. In step 206, the image side signal of the image side option selected by the user is transmitted to the processor. In step 207, the processor enables the corresponding module or modules (e.g., the printing module storing the printing program codes for controlling the printer assembly) according to the image side signal to perform a copy operation. In this embodiment, when the user places the information medium on or in the input tray 132 of the automatic document feeder 13, the detector detects the presence of the information medium and transmits the message to the processor. The processor enables the automatic image acquiring instruction to firstly store the image sides of the information medium facing upward and downward into the buffer, and enables the options of the image sides to be selected by the user. If there are multiple information media, then the copying system only scans the first information medium and then stops transporting other information media to make the image side options enter a standby state. Thus, the user can clearly select the pages to be copied. For example, the user can effectively study or understand how to select the image side in the waiting time during which the first information medium is scanned. In addition, when there are other information media, or the user further places other information media within a predetermined time (e.g., 5 to 10 seconds), the processor further enables the corresponding module or modules (e.g. the image extracting module storing the image acquiring program codes, and the printing module storing the printing program codes for controlling the image acquiring (scanning) assembly and the printer assembly, respectively) according to other detection signals of the detector detecting the presence of other information media and the image side signals to perform the copy and image acquiring operations on other information media. For example, the front side, reverse side or both-side image acquiring or copying operation for the subsequent information medium is performed according to the copy option of the first information medium. This configuration is suitable for the state where a lot of information media are to be copied and the input tray cannot accommodate so much information media at a time.

Figure 6:
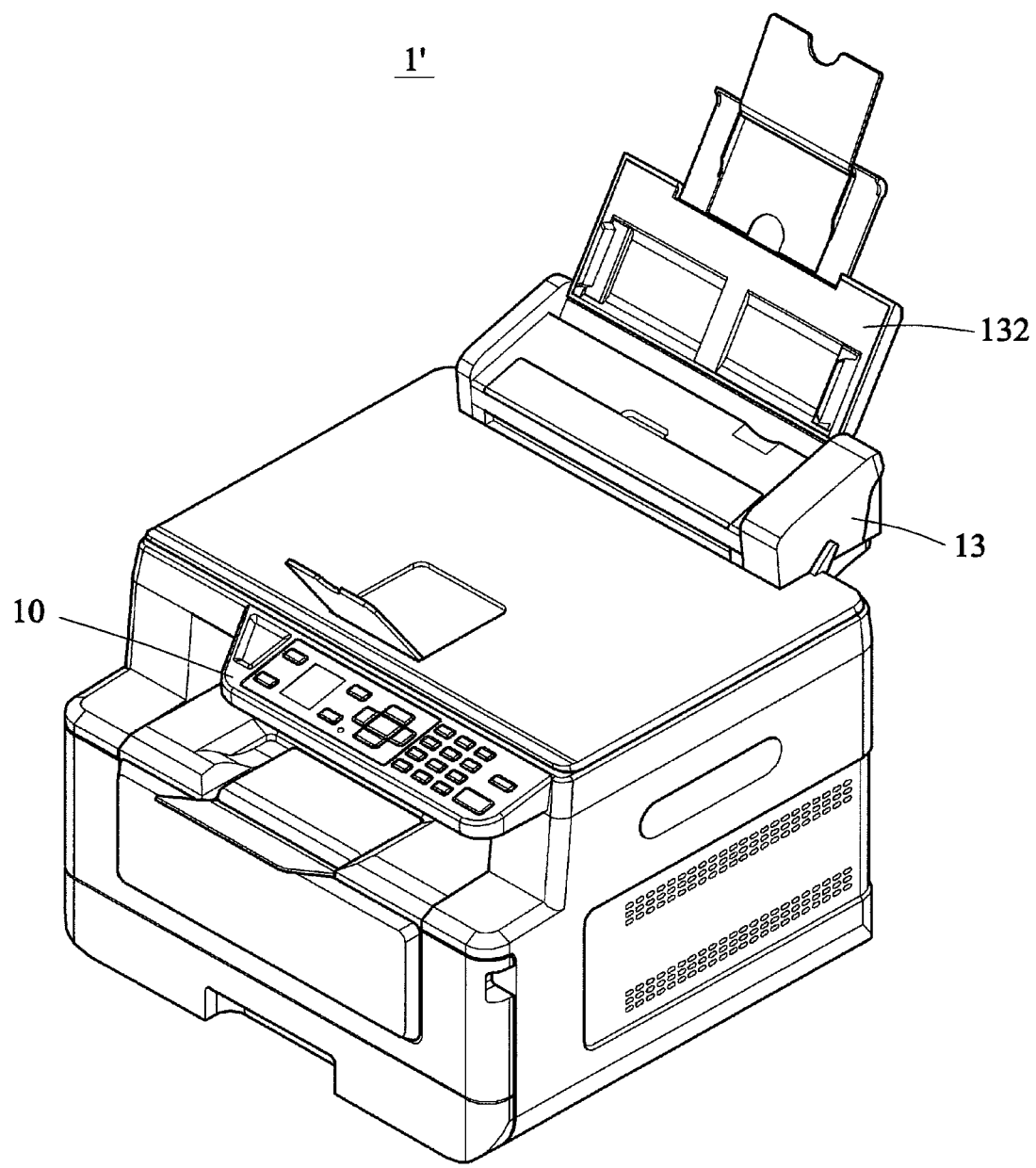
FIG. 6 is another example showing the peripheral electronic device having an automatic document feeder according to this disclosure.
Figure 6A:
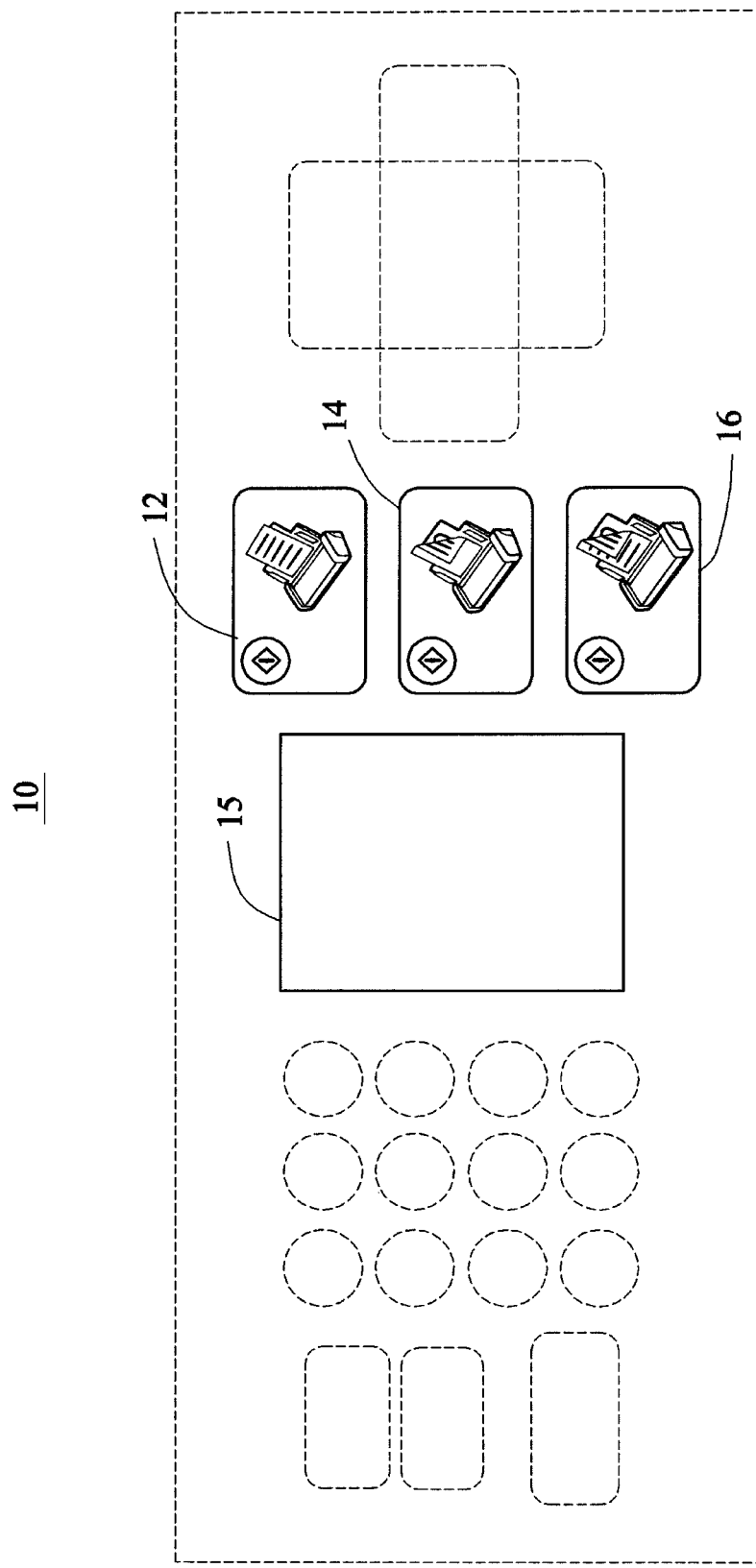
FIG. 6a is a schematic view showing an operation interface in a copying method according to a ninth embodiment of this disclosure.

FIG. 6 is another example showing the peripheral electronic device having an automatic document feeder 1' according to this disclosure. As shown in FIG. 6, the peripheral electronic device 1' is similar to FIG. 1 except for the difference that the input tray 132 of the automatic document feeder 13 is in a substantially upright state. It is worth noting that the input tray 132 of the automatic document feeder 13 may also have the completely upright state. In the above-mentioned state, the user has to judge whether the image side of the information medium faces frontward or backward or both images side of the information medium are to be copied. FIG. 6a is a schematic view showing an operation interface in a copying method according to a ninth embodiment of this disclosure. The embodiment is similar to FIG. 1a except for the difference that the patterns or graphic icons of the operation buttons 12, 14 and 16 can make the user clearly understand the front side, the back side or the both sides. FIG. 6b is a schematic view showing an operation interface in a copying method according to a tenth embodiment of this disclosure. The embodiment is similar to FIG. 1c except for the difference that the texts of the operation buttons 12',14' and 16' can make the user understand the front side, the back side or the both sides. It is worth noting that the above-mentioned FIGS. 1b, 1d to 1f are also applied to the peripheral electronic device of FIG. 6.

In this embodiment, the image side option can be enabled when the processor receives the signal of the detector detecting the presence of the information medium, or after the processor receives the acquired image side of the information medium.

Figure 7A:
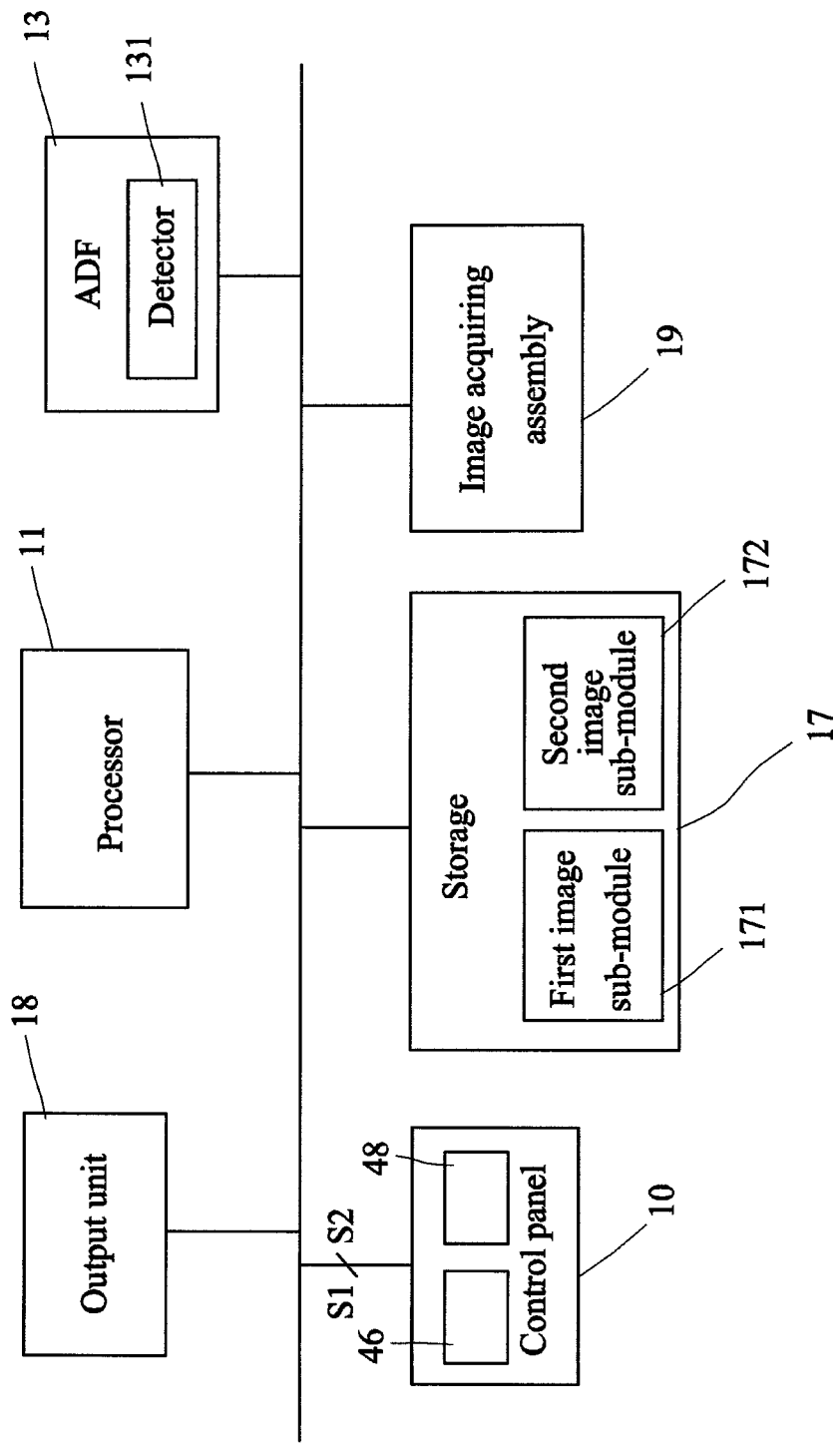
FIG. 7a is a system block diagram showing a copying method according to an eleventh embodiment of this disclosure.
Figure 7B:
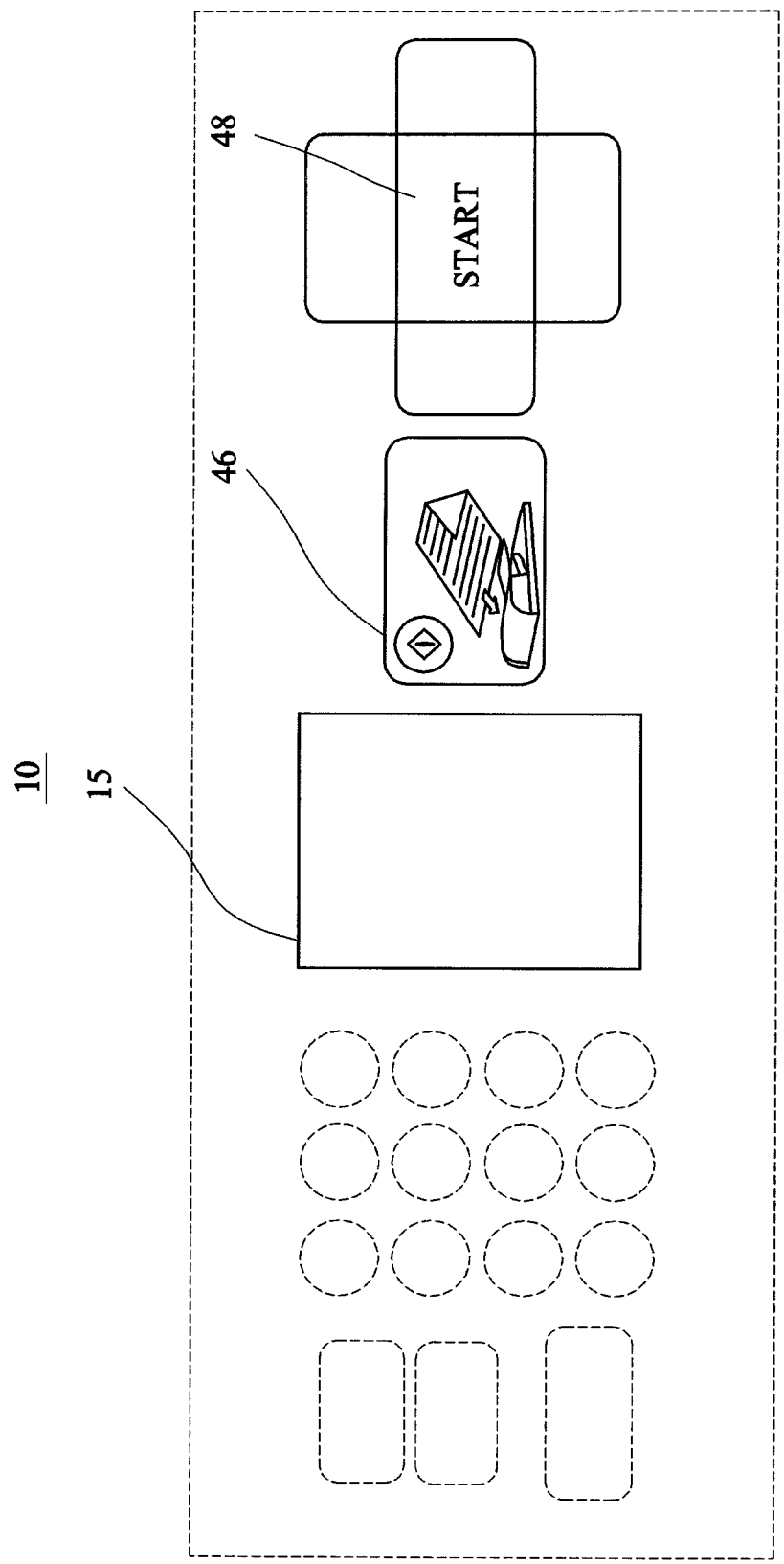
FIGS. 7b and 7c are schematic views showing an operation interface of two examples of the copying method according to the eleventh embodiment of this disclosure.
Figure 7C:
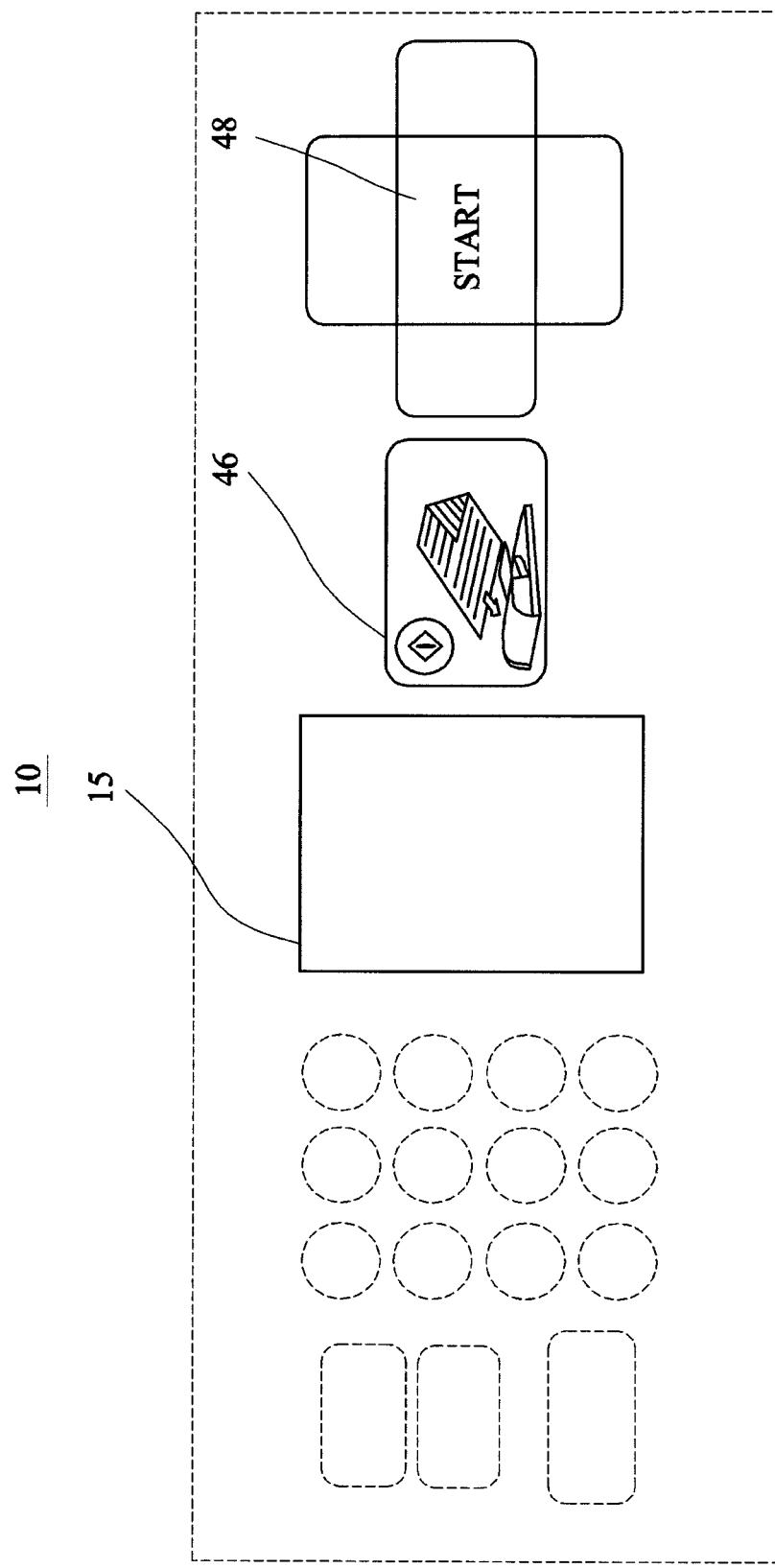

FIG. 7a is a system block diagram showing a copying method according to an eleventh embodiment of this disclosure. FIGS. 7b and 7c are schematic views showing an operation interface of two examples of the copying method according to the eleventh embodiment of this disclosure. As shown in FIGS. 7a and 7b, the control panel 10 of this example further comprises a start button 48 for transmitting a second signal S2 to the processor 11, and the operation button (image acquiring side selecting button) is one single operation button 46 for transmitting the first signal S1 to the processor 11. In FIG. 7b, the operation button 46 is a simplex image acquiring selection button providing the indication to the user that the image acquiring side faces upward (in another example, the indication provided to the user indicates that the image acquiring side faces downward), and the start button 48 is to start the copying operation. When the processor 11 receives the first signal S1 and the second signal S2 (for example, the user firstly presses the operation button 46, and then presses the start button 48, or simultaneously presses the two operation buttons), the processor 11 controls the image acquiring assembly 19 to acquire only the image of the first side. That is, the user has to select the image acquiring side(s) firstly, and then enable the image acquiring operation. When the processor 11 receives only the first signal S1 and does not receive the second signal S2 (for example, the user only presses the operation button 46), the image acquiring assembly 19 is disabled and continuously waits for the user's indication. Of course, the start button 48 may output the optical or audio message to guide the user to press down the start button 48. That is, the user's operation of selecting the image acquiring side(s) cannot start the image acquiring operation. When the processor 11 receives only the second signal S2 and does not receive the first signal S1 (for example, the user only presses the start button 48), the processor 11 controls the image acquiring assembly 19 to acquire the images of the first side and the second side. That is, the default starting mode of the whole image acquiring device is a duplex image acquiring mode. Thus, a simple operation method may also be provided.

The example of FIG. 7c is similar to that of FIG. 7b except for the difference that the default starting mode of the whole image acquiring device is a simplex image acquiring mode, the operation button 46 is a duplex image acquiring selection button providing the indication of both image acquiring sides to the user. Thus, when the processor 11 receives the first signal S1 and the second signal S2, the processor 11 controls the image acquiring assembly 19 to acquire the images of the first side and the second side. When the processor 11 receives only the first signal S1 and does not receive the second signal S2, the image acquiring assembly 19 is disabled and continuously waits for the user's indication. Of course, the start button 48 may output the optical or audio message to guide the user to press down the start button 48. When the processor 11 receives only the second signal S2 and does not receive the first signal S1, the processor 11 controls the image acquiring assembly 19 to acquire only the image of the first side. Thus, another simple operation method may also be provided.

In summary, this disclosure provides a copying method and a peripheral system using the copying method to facilitate the user in directly and instinctively selecting the image side(s) to be copied according to the images. Thus, it is possible to prevent the to-be-copied data page from being incorrectly placed on the input tray, and to achieve the human-oriented, environment protective and source saving effects.

While this disclosure has been described by way of examples and in terms of preferred embodiments, it is to be understood that this disclosure is not limited thereto. To the contrary, it is intended to cover various modifications. Therefore, the scope of the appended claims should be accorded the broadest interpretation so as to encompass all such modifications.

What is claimed is:

1. An image acquiring device for selecting one or multiple image acquiring sides of an information medium to be copied, the image acquiring device comprising:
   an automatic document feeder comprising an input tray supporting the information medium;
   a control panel comprising one or multiple operation buttons for selecting the image acquiring side or sides of the information medium;
   at least one image acquiring assembly acquiring one or multiple images of the image acquiring side or sides of the information medium;
   a processor electrically connected to the automatic document feeder, the image acquiring assembly and the operation button or operation buttons;
   a storage, which is electrically connected to the processor, and comprises at least one image module, which stores program codes for enabling image acquiring and storing operations on the one or multiple images of the image acquiring side or sides of the information medium; and
   an output unit, which is electrically connected to the processor, and receives and outputs the one or multiple images of the image acquiring side or sides of the information medium;
   wherein the processor controls the image acquiring assembly to acquire the one or multiple images of the image acquiring side or sides of the information medium according to the program codes and different signals of the operation button or operation buttons on the control panel, and transmits the one or multiple images to the output unit, wherein the operation button or one of the operation buttons indicates that the information medium is placed in the input tray of the automatic document feeder with the image acquiring side or one of the image acquiring sides facing upward, downward, frontward or backward to facilitate a user in directly and instinctively selecting the image acquiring side or sides to be copied according to information present on the operation button or buttons to be pressed by the user.

2. The image acquiring device according to claim 1, wherein:
   the one or multiple operation buttons provide a first side option, a second side option and a duplex option for setting to perform the image acquiring and storing operations on a first side, a second side and the first side and the second side of the information medium to let a user select a copy mode, wherein the multiple image acquiring sides are the first side and the second side of the information medium, and the one image acquiring side is the first side or the second side of the information medium; and
   after the copy mode is selected, the processor controls the image acquiring assembly to acquire the one or multiple images of the image acquiring side or sides of the information medium.

3. The image acquiring device according to claim 2, wherein the image module comprises:
   a first image sub-module storing a first portion of the program codes and the image of the first side of the information medium; and
   a second image sub-module storing a second portion of the program codes and the image of the second side of the information medium.

4. The image acquiring device according to claim 3, wherein the processor further receives a duplex acquiring signal to control the image acquiring assembly to acquire the images of the first side and the second side of the information medium.

5. The image acquiring device according to claim 4, wherein the image acquiring assembly comprises a first image acquiring sub-assembly and a second image acquiring sub-assembly; wherein the first image sub-module controls the first image acquiring sub-assembly to acquire and store the image of the first side of the information medium; the second image sub-module controls the second image acquiring sub-assembly to acquire and store the image of the second side of the information medium; and the duplex acquiring signal controls to enable the first image sub-module and the second image sub-module.

6. The image acquiring device according to claim 4, wherein the image acquiring assembly comprises an image acquiring sub-assembly; wherein the first image sub-module controls the image acquiring sub-assembly to acquire and store the image of the first side of the information medium; the second image sub-module controls the image acquiring sub-assembly to acquire and store the image of the second side of the information medium; and the duplex acquiring signal controls the image acquiring sub-assembly to acquire and store the images of the first side and the second side of the information medium.

7. The image acquiring device according to claim 2, wherein there is only one single operation button, which transmits three different signals to start acquiring and storing the image of the first side of the information medium, the image of the second side of the information medium or the images of the first side and the second side of the information medium into the image module.

8. The image acquiring device according to claim 7, wherein:
   the first side is a top side of the information medium when the information medium is placed in the input tray; and the second side is a bottom side of the information medium when the information medium is placed in the input tray; or
   the first side is a front side of the information medium when the information medium is placed in the input tray; and the second side is a back side of the information medium when the information medium is placed in the input tray.

9. The image acquiring device according to claim 2, wherein the operation buttons are three operation buttons comprising:

a first side operation button transmitting a first signal to enable corresponding functions of acquiring and storing the image of the first side of the information medium;

a second side operation button transmitting a second signal to enable corresponding functions of acquiring and storing the image of the second side of the information medium; and a duplex operation button transmitting a duplex acquiring signal to enable corresponding functions of acquiring and storing the images of the first side and the second side of the information medium.

10. The image acquiring device according to claim 2, wherein the operation buttons are two operation buttons comprising:

a first side operation button transmitting a first signal to enable corresponding functions of acquiring and storing the image of the first side of the information medium; and a second side operation button transmitting a second signal to enable corresponding functions of acquiring and storing the image of the second side of the information medium, wherein when the first side operation button and the second side operation button are pressed in a time period, the first side operation button and the second side operation button transmit a duplex acquiring signal to enable corresponding functions of acquiring and storing the images of the first side and the second side of the information medium.

11. The image acquiring device according to claim 2, wherein the control panel further comprises a start button for transmitting a second signal to the processor, and the operation button transmits a first signal to the processor, wherein:

when the processor receives the first signal and the second signal, the processor controls the image acquiring assembly to acquire only the image of the first side; when the processor receives only the first signal and does not receive the second signal, the image acquiring assembly is disabled; and when the processor receives only the second signal and does not receive the first signal, the processor controls the image acquiring assembly to acquire the image of the first side and the image of the second side; or when the processor receives the first signal and the second signal, the processor controls the image acquiring assembly to acquire the images of the first side and the second side; when the processor receives only the first signal and does not receive the second signal, the image acquiring assembly is disabled; and when the processor receives only the second signal and does not receive the first signal, the processor controls the image acquiring assembly to acquire only the image of the first side.

12. The image acquiring device according to claim 2, wherein the first side option outputs a first signal, the second side option outputs a second signal, and the duplex option outputs a third signal to operate the image acquiring assembly.

13. The image acquiring device according to claim 1, wherein at least one of the operation buttons is electrically connected to a simplex image acquiring sub-assembly of the image acquiring assembly facing upward, downward, frontward or backward when the information medium is placed in the input tray, and another one of the operation buttons is electrically connected to a duplex image acquiring sub-assembly of the image acquiring assembly.

14. The image acquiring device according to claim 1, wherein the automatic document feeder further comprises a detector disposed at an input end of the input tray, wherein the detector detects presence of the information medium, and enables the operation button to enable one or multiple setting options of the image acquiring side or sides.

15. A copying system for selecting to copy an image of a first side, an image of a second side or the images of the first side and the second side of an information medium, the copying system comprising:

an automatic document feeder comprising:

an input tray supporting the information medium so that image acquiring and storing operations of the information medium are performed; and a detector detecting presence of the information medium;

a control panel using one or multiple operation buttons to display images of a first side option, a second side option and a duplex option for setting to perform the image acquiring and storing operations on the first side, the second side and the first side and the second side of the information medium to let a user select a copy mode; and an image acquiring assembly operating according to a corresponding signal outputted based on setting of one of the first side option, the second side option and the duplex option of the operation button or buttons;

wherein the first side option outputs a first signal, the second side option outputs a second signal, and the duplex option outputs a third signal to operate the image acquiring assembly.

16. The copying system according to claim 15, wherein the image acquiring assembly comprises: a first image acquiring sub-assembly for acquiring the image of the first side of the information medium; and a second image acquiring sub-assembly for acquiring the image of the second side of the information medium.

17. The copying system according to claim 15, wherein the image acquiring assembly comprises an image acquiring sub-assembly acquiring the images of the first side and the second side of the information medium at a first time point and a second time point, respectively.

18. A copying method of an image acquiring device, the copying method comprising steps of:

(a) automatically detecting an information medium disposed in an automatic document feeder;

(b) enabling an image side option on the automatic document feeder to enter a standby state;

(c) making a user select one or multiple image acquiring sides of the information medium according to the image side option, wherein the image side option indicates that the information medium is placed in an input tray of the automatic document feeder with the image acquiring side or one of the image acquiring sides of the information medium facing upward, downward, frontward or backward to facilitate the user in directly and instinctively selecting the image acquiring side or sides to be copied according to information present on the image side option to be pressed by the user;

(d) transmitting an image side signal, which is generated after the user selects the image side option, to a processor; and (e) enabling, by the processor, a corresponding module or modules to perform a copy operation according to the image side signal.

19. The copying method according to claim 18, wherein in the steps (a) and (b), the processor automatically enables a duplex image acquiring and storing mode to automatically transport the information medium and acquire a duplex image of the information medium according to a detection signal generated when a detector of the image acquiring device automatically detects presence of the information medium, and to store the acquired duplex image into a buffer of the image acquiring device.

20. The copying method according to claim 19, wherein in the step (e), the processor further enables the corresponding module or modules to perform copy and image acquiring operations on other information media according to the image side signal and the detector, which detects the other information media to generate other detection signals.

21. The copying method according to claim 18, wherein:
the image side option comprises a duplex option and one or both of a first side option and a second side option of placing the information medium on the automatic document feeder with the image acquiring side of the information medium facing upward or downward; or
the image side option comprises the duplex option and one or both of the first side option and the second side option of placing the information medium on the automatic document feeder with the image acquiring side of the information medium facing frontward or backward.

* * * * *